(12) United States Patent
Cox

(10) Patent No.: US 10,484,743 B2
(45) Date of Patent: Nov. 19, 2019

(54) METHOD AND APPARATUS FOR DELIVERY OF PROGRAMS AND METADATA TO PROVIDE USER ALERTS TO TUNE TO CORRESPONDING PROGRAM CHANNELS BEFORE HIGH INTEREST EVENTS OCCUR DURING PLAYBACK OF PROGRAMS

(71) Applicant: Sirius XM Radio Inc., New York, NY (US)

(72) Inventor: Stuart Anderson Cox, Roswell, GA (US)

(73) Assignee: Sirius XM Radio Inc., New York, NY (US)

(*) Notice: Subject to any disclaimer, the term of this patent is extended or adjusted under 35 U.S.C. 154(b) by 0 days.

(21) Appl. No.: 15/812,391

(22) Filed: Nov. 14, 2017

(65) Prior Publication Data
US 2018/0167684 A1    Jun. 14, 2018

Related U.S. Application Data

(63) Continuation of application No. 14/233,544, filed as application No. PCT/US2012/047656 on Jul. 20, 2012, now Pat. No. 9,820,000.
(Continued)

(51) Int. Cl.
*H04N 21/478* (2011.01)
*H04N 21/433* (2011.01)
(Continued)

(52) U.S. Cl.
CPC ......... *H04N 21/478* (2013.01); *H04N 21/435* (2013.01); *H04N 21/4331* (2013.01);
(Continued)

(58) Field of Classification Search
CPC ............ H04N 21/4331; H04N 21/454; H04N 21/8133; H04N 21/435; H04N 21/478; H04N 21/47214
See application file for complete search history.

(56) References Cited

U.S. PATENT DOCUMENTS 6,366,959 B1 * 4/2002 Sidhu ............... H04J 3/0632
709/214
6,839,901 B1 * 1/2005 De Saint Marc .... H04N 21/235
725/32
(Continued)

OTHER PUBLICATIONS

International Search Report PCT Application No. PCT/US12/47656, International Filing Date Jul. 20, 2012, dated Oct. 16, 2012.

*Primary Examiner* — Chenea Davis
(74) *Attorney, Agent, or Firm* — Kramer Levin Naftalis & Frankel LLP

(57) ABSTRACT

Systems, methods and devices are provided to alert a user of content delivered on multiple channels to events of interest occurring on channels other than the channel being listened to or viewed. Playback of content in which an event of interest or key event has occurred is time-shifted or delayed at the content transmission source or at the user device. Metadata that identifies events of interest in the content is transmitted to the user device. The user device generates alerts to the user based on the metadata in sufficient lead time to enable the user to not only tune to a channel on which an event of interest is occurring, but to do so sufficiently in advance of an event of interest so as to hear and/or see relevant portions of the content leading up to and/or following such an event.

18 Claims, 15 Drawing Sheets

Related U.S. Application Data

(60) Provisional application No. 61/510,264, filed on Jul. 21, 2011.

(51) Int. Cl.
  *H04N 21/454* (2011.01)
  *H04N 21/472* (2011.01)
  *H04N 21/435* (2011.01)
  *H04N 21/81* (2011.01)

(52) U.S. Cl.
  CPC ..... *H04N 21/454* (2013.01); *H04N 21/47214* (2013.01); *H04N 21/8133* (2013.01)

(56) References Cited

U.S. PATENT DOCUMENTS

| | | | |
|---|---|---|---|
| 8,424,043 B1* | 4/2013 | McClellen | H04N 21/233 |
| | | | 725/40 |
| 2002/0010922 A1 | 1/2002 | Darin et al. | |
| 2003/0018967 A1 | 1/2003 | Gorbatov et al. | |
| 2006/0010472 A1* | 1/2006 | Godeny | G06F 17/30038 |
| | | | 725/62 |
| 2007/0009236 A1 | 1/2007 | Kovacevic | |
| 2008/0066111 A1* | 3/2008 | Ellis | H04N 5/44543 |
| | | | 725/57 |
| 2008/0127275 A1* | 5/2008 | Tang | H04N 21/235 |
| | | | 725/56 |
| 2009/0093278 A1 | 4/2009 | Negron et al. | |
| 2010/0268361 A1 | 10/2010 | Mantel et al. | |
| 2010/0275228 A1 | 10/2010 | Panje | |

\* cited by examiner

METHOD AND APPARATUS FOR DELIVERY OF PROGRAMS AND METADATA TO PROVIDE USER ALERTS TO TUNE TO CORRESPONDING PROGRAM CHANNELS BEFORE HIGH INTEREST EVENTS OCCUR DURING PLAYBACK OF PROGRAMS

CROSS REFERENCE TO RELATED APPLICATIONS

This application is a continuation of U.S. patent application Ser. No. 14/233,544, filed on Jan. 17, 2014, which is a 371 of International Patent Application No. PCT/US2012/047656, filed on Jul. 20, 2012, which claims the benefit of U.S. Provisional Patent Application No. 61/510,264, filed on Jul. 21, 2011.

Related subject matter is disclosed and claimed in U.S. Pat. No. 7,180,917, in U.S. Pat. No. 7,454,166, in U.S. Pat. No. 7,822,381, in U.S. patent application Ser. No. 12/000,198, filed Dec. 10, 2007, in U.S. patent application Ser. No. 12/735,211, filed Dec. 27, 2007, in U.S. Pat. No. 8,223,975, in International PCT Application No. PCT/US2012/25091, filed Feb. 14, 2012, and in U.S. patent application Ser. No. 13/531,440, filed Jun. 22, 2012, the entire contents of which are incoprated herein by reference.

FIELD OF THE INVENTION

The present invention relates generally to methods and systems for alerting a user of content delivered on multiple channels (e.g., a multi-channel broadcast or content streaming service) to events of interest occurring on channels other than the one being listened to or viewed. More specifically, the present invention employs time-shifted or delayed playback of content (e.g., content caching), and metadata that identifies events of interest in the content, to generate alerts in sufficient lead time to enable a user to not only tune to a channel on which an event of interest is occurring, but to do so sufficiently in advance of an event of interest so as to hear and/or see relevant portions of the content leading up to and/or following such an event.

BACKGROUND OF THE INVENTION

Many if not most sporting events are characterized by a few exciting events (hereinafter referred to as "Key Events") interspersed between long periods of otherwise unremarkable play activity. For example, a baseball game comprises mostly, for example, batter preparation, pitched balls and strikes, inning changes, and batters not getting on base, with only a small percentage of the overall game time involving hits, runs, stolen bases, double plays, exciting catches and the like. Similarly, for sports like soccer, football, hockey and others, Key Events constitute only a small portion of the total time the game is actually played.

When listening to a broadcast or streamed sports game on a radio or other user device, much of the game can be somewhat monotonous to the casual fan beyond whatever interest the game's announcers can generate, particularly when the transmission includes only audio. A need therefore exists for user devices that enable a listener to be notified of and then hear just the "high points" of a game, while listening to a different radio channel or going about some other activity during the rest of the game.

At the other end of the listener spectrum lies the sports enthusiast, sports handicapper, sports "pool" enthusiast or sports gambler. These users often try to watch or listen to multiple games at once. For such users, a Sunday afternoon packed with multiple and concurrent games can be challenging, inasmuch as such a listener is often conflicted as to which game to listen to, and never knows when "the big play" may occur in any one of them. Thus, a similar need also exists for a user device that enables a user to know, ahead of time, which of many games to tune to and when, and to then automatically, or automatically offer to, tune to the appropriate channel in sufficient time to hear or view a "big play" or other Key Event in each game.

Accordingly, a need exists for a Key Event alert function in a radio receiver or other user device. Such functionality would alert a user before a Key Event occurs, giving the listener sufficient time to tune to the channel and hear the excitement unfold. Moreover, much of the excitement of listening to a big play is hearing the setup that leads to it, such as, for example, a power hitter walking up to bat, a football team taking offensive formation before the snap, or various passes and maneuvers preceding a successful soccer goal. Thus, a need also exists for a Key Event alert operation that can alert a user well before the actual Key Event occurs, thus giving the user time to tune to the channel and hear or view relevant activity preceding the Key Event, as well as any relevant post-event activity, such as, for example, newscaster commentary and crowd reaction.

SUMMARY OF THE INVENTION

In accordance with an illustrative embodiments of the present invention, systems and methods are provided for receiving data corresponding to monitored live action of a sports event, concert, news segment or other program, and using the monitored event data to generate Event Metadata about a Key Event as the monitored event is broadcast, streamed or otherwise transmitted to radio receiver(s) or other user playback device(s). A receiver continuously buffers the broadcast or streamed content as it is received, which allows playing the content with a slight delay (e.g., on the order of a minute or so) from real-time content reception. At the same time, the receiver can process the Event Metadata and use it to generate an alert about the Key Event to a user. Alternatively, the content can be buffered or otherwise delayed by the uplink. The combination of the received Event Metadata and slightly delayed content playback allows the receiver or user device to provide alerts to the user just before the Key Event is played by the receiver.

In accordance with an illustrative embodiment of the present invention, a method is provided whereby a radio receiver or other user playback device receiving a live sports channel, or alert supported program channel, can generate a Key Event alert shortly before the corresponding Key Event is about to occur in the buffered program, such as, for example, a scoring run, stolen base, touchdown, goal attempt, etc. For a radio receiver or other user device that is receiving multiple channels, a user interface can be configured to provide alerts and channel navigation options to enable a user to tune from a currently tuned channel to the alert supported channel (e.g., sports event channel) in time to hear the Key Event. A casual sports listener can thus listen to other channels (e.g., music, talk radio, news, etc.) and be assured he will be able to tune to the sports event channel when something "interesting" (i.e., a Key Event) is about to occur. Further, the user interface can be configured to enable a sports enthusiast to monitor multiple concurrent sports event channels, and tune between several simultaneous games just in time to hear the action highlights (i.e., Key Events) for each game.

BRIEF DESCRIPTION OF THE DRAWINGS

The invention will be more readily understood with reference to the illustrative embodiments thereof illustrated in the attached drawing figures, in which.

Throughout the drawing figures, like reference numbers will be understood to refer to like elements, features and structures.

DETAILED DESCRIPTION OF ILLUSTRATIVE EMBODIMENTS

Figure 1:
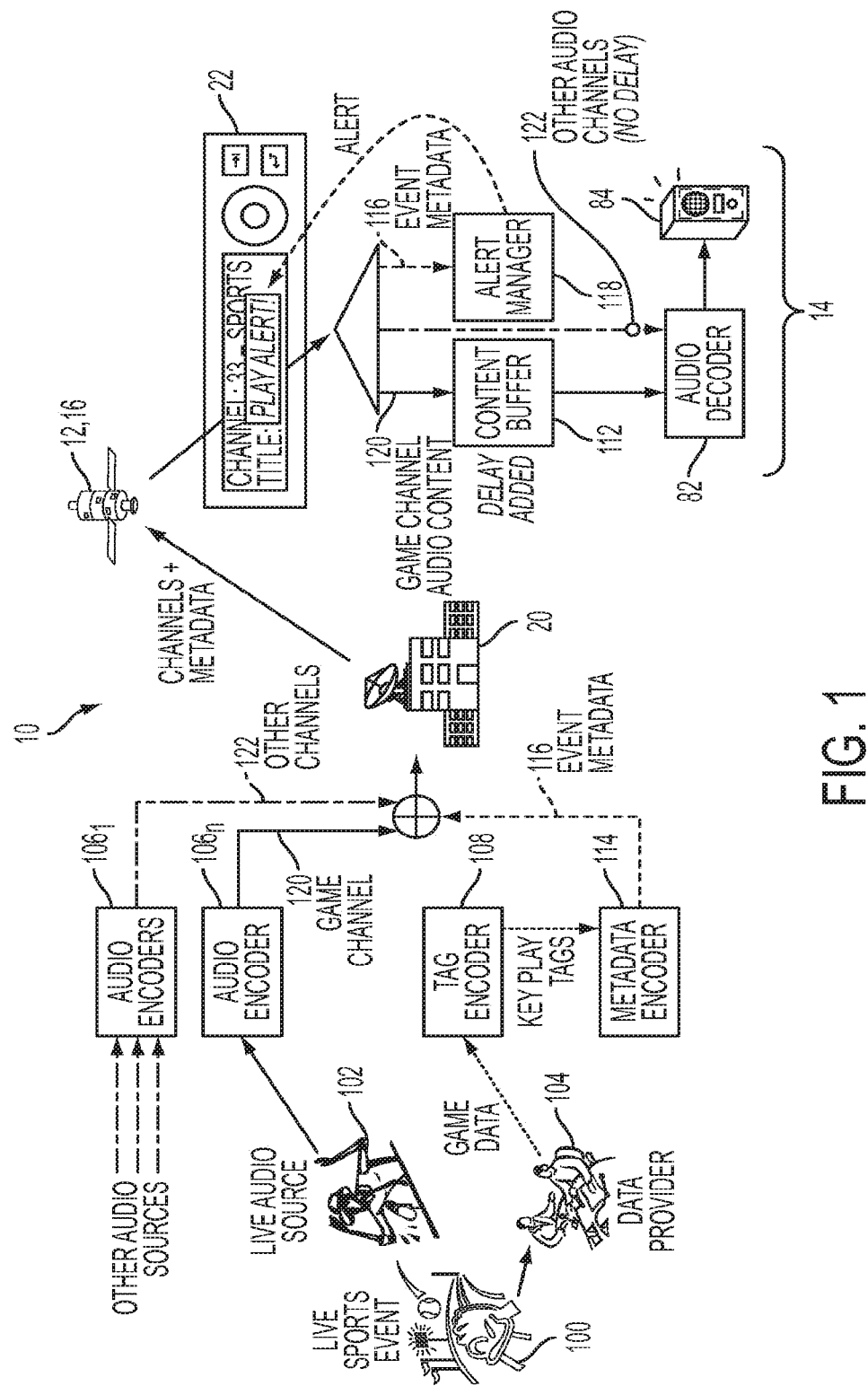
FIG. 1 depicts a broadcast or streamed content delivery system for providing users with Key Event alerts in accordance with an illustrative embodiment of the present invention.
Figure 2:
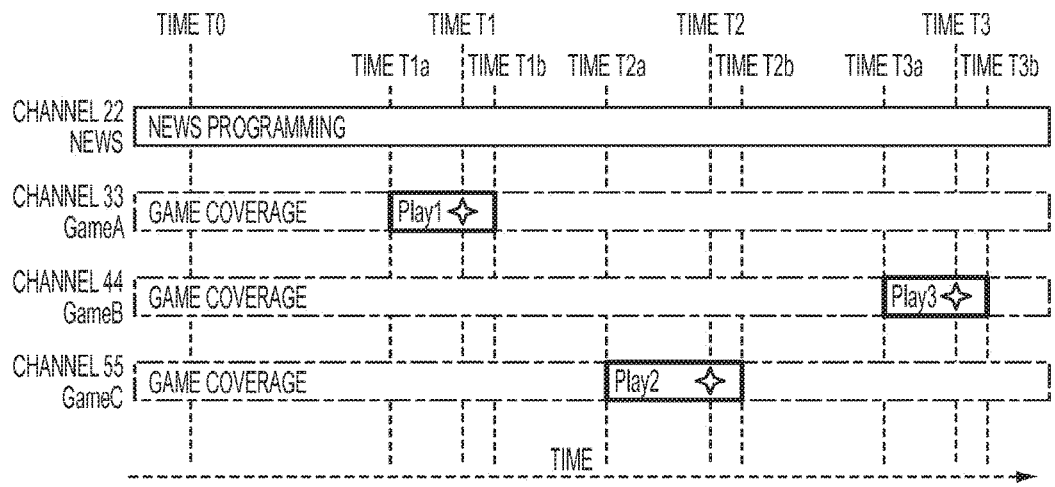
FIG. 2 depicts an example of broadcast or streamed channels comprising Key Events in accordance with an illustrative embodiment of the present invention.

Several illustrative embodiments of the present invention are described herein. For illustrative purposes, FIGS. 1 and 2 provide an example of how a Key Event alert can be generated by a radio receiver for a live sporting event being broadcast via satellite. As described below, different types of programs or content, different criteria for identifying Key Events, various content transmission modes, and various user devices can all be used in various illustrative embodiments of the present invention.

As used herein, a "Key Event" refers an event during a transmitted program or other content that is considered to be of high interest to a user (e.g., according to various defined criteria). For example, with regard to the example of a Key Event alert during a sports game as shown in FIG. 1, a Key Event refers to play action during the game that is considered to be of high interest to a user such as, for example, a score, stolen base, goal attempt, outstanding play, kickoff, field goal, interception, fumble, hit, penalty, celebrity appearance at pre-game or halftime (e.g., the President of the United States throwing out the first ball), among other events. It is understood that any number of types of events could be considered a Key Event, that the transmitted program containing a Key Event need not necessarily be a sports-related program (e.g., the transmitted program can be a news broadcast, concert, comedy show, or other program for which Event Metadata can be provided), and that no event types, transmitted programs, transmission mode, type of user device, or Key Event defining criteria, are intended to be excluded by omission herein.

Generally, alerting a user to tune to a Key Event shortly after, or even simultaneously with, a Key Event is too late. Such an alert does not provide an effective user experience where events and actions immediately preceding or following the Key Event is also interesting content. Thus, a timely Key Event alert operation allows a user the opportunity to start listening to play action at some time before the Key Event. Moreover, for many Key Events, not knowing what is about to transpire as the preceding or building play action progresses can be an important element to the enjoyment of the event (i.e., a surprise element).

With continued reference to FIG. 1, a Key Event alert operation can, for example, be provided by a broadcast or streaming reception and playback device 14 such as, for example, a radio receiver (e.g., AM, FM, HD or SDARS receiver), a computer (e.g., a personal computer (PC), a laptop or other portable programmable computing device), a mobile phone, a smartphone, a tablet device, or a television (TV), among other user devices. Playback device 14 can be configured, for example, to receive a transmitted stream comprising a plurality of program or content channels. Alternatively, playback device 14 can be configured to receive only one content channel at a time, but can, for example, also be capable of tuning to one of a plurality of channels such as, for example, when IP streaming content to a phone, PC, etc. In such cases, the device receives only one channel at a time, in contrast to SDARS or other method of content delivery where a device receives multiple channels but may not actually fully decode them all at one time.

For illustrative purposes, the various program channels in FIG. 2 comprise a different sporting event on each of three channels, and a news program on the other channel. In accordance with an aspect of the present invention, and as explained in more detail below, Key Event alerts can be used with various different types of content and programs and are not limited to generating alerts for sports events. Briefly, metadata used to generate the alerts, as well as various criteria by which Key Events and their duration in time, can be defined and can be diverse and rich. Therefore, in exemplary embodiments of the present invention, Key Event alerts can also be provided during news programs, talk radio shows, entertainment programs, broadcast performances, concerts and other performances. The Key Events can be, for example, as diverse as artists' commentary during concerts or performances, song or guest artist introductions, or, for example, commentary by a particular newscaster, political candidate, or the like, during coverage of a selected news event.

As noted, the example of FIG. 2 involves broadcast content for a small number of channels. It is understood that in various exemplary embodiments there could be, for example, many more channels (e.g., on the order of hundreds of channels); that the channels can be broadcast, multicast, or unicast to the receiver or playback device; that the channels can be transmitted over satellite, a terrestrial wireless system (FM, HD Radio, etc.), over a cable TV carrier, streamed over an internet, cellular or dedicated IP connection or various combinations thereof, among other content transmission modes; and that the content of the channels can include one or more of music, news, talk radio, traffic/weather reports, comedy shows, live sports events, commercial announcements and advertisements, among other types of programs. As used herein, "broadcast channel" is understood to refer to any method used to convey content, of whatever type, to a receiving device, and "broadcast system" to refer to any system providing such content. As also used herein, the term "Alert Supported Channel" refers to a channel or a program for which Key Event alerting is supported, using various exemplary methods and systems of the present invention.

Overview of System and Method for Generating Event Alerts

FIG. 1 illustrates exemplary components of a system 10 for implementing a Key Event alert in a user device in accordance with an illustrative embodiment of the present invention. An example method of operation is described with respect to one channel providing a live sports event which can be transmitted with various other channels. It is understood that devices 14 receiving a Key Event alert in accordance with an illustrative embodiment of the present invention are devices that can either (i) simultaneously receive a plurality of broadcast or streamed program channels, or (ii) receive one channel but tune to any of a plurality of broadcast or streamed program channels. It is further understood that a channel can carry essentially any type of content (e.g., music, news, live events, etc.), for any of which a Key Event alert can be generated.

Broadcast system 10 can, for example, send metadata corresponding to an Alert Supported Channel 120 (here a "Game Channel"), and can, for example, use this capability to send notifications of events (hereinafter referred to as "Event Metadata" 116) such as, for example, text or binary data that correspond to Key Events. Event Metadata 116 can, for example, be provided concurrently with, or, for practical data entry reasons, a few seconds following, the occurrence of a Key Event in a transmitted event or program. Therefore, in a typical use, Event Metadata 116 may not be useful for alerting a user in time to hear and/or see the event as it occurs in a transmitted game or program, and certainly not in time to hear any setup for the event, such as, for example, the prelude to a big play (e.g., a home run hitter walking up to bat, a football team taking offensive formation before the snap, or various maneuvers and passes preceding a soccer goal). As noted, in accordance with an aspect of the present invention, Event Metadata 116 corresponding to Key Events in a game or program transmitted on an Alert Supported Channel 120 can, for example, be employed to provide users with Key Event alerts. Such alerts can then be generated visually at playback device 14 on a display screen 22, and/or, for example, as audible alerts via speaker 84.

Continuing with reference to FIG. 1, a broadcaster or content provider 20 can receive a live audio feed 102 from the sports event. An operator 104 can, for example, monitor live audio feed 102, and when operator 104 hears an event that he or she considers a "Key Event" (using defined criteria for example), he can, for example, tag it as such by pressing a button or key on a console, for example. He can, for example, optionally also enter or select additional information that further characterizes the Key Event, such as, for example, (i) the type of play (e.g., hit, score, fumble, goal, etc.), (ii) how long before the play was tagged that related play action started (e.g., 15 seconds, 1 minute, etc.), and (iii) how long after the play was tagged that the broadcast content continued to cover the play with subsequent play action and/or announcer commentary. The information created by operator 104 is sometimes referred to herein as "Monitored Event Data", and in FIG. 1 it is shown as "game data." Some or all of the Monitored Event Data can be captured and encoded as Event Metadata 116 in, for example, binary or text form. Alternatively, for example, an agent other than broadcast operator 104, or, for example, an automated monitoring method, can be used to monitor either a live event 100 or prerecorded content, and automatically identify Key Events therein and generate Event Metadata 116 and/or generic play or event data. In addition, the agent can generate general event data and statistics without necessarily intending such data to be used only for determining Key Events. Subsequently, a subsystem (e.g., tag encoder 108) that receives such general event data can analyze it and the statistics to determine which data implies that a Key Event has occurred (e.g, using defined criteria).

With continued reference to FIG. 1, the broadcaster, uplink or other content provider 20 transmits live audio content 102 for the game on a designated channel 120 (e.g., "Game Channel"), along with the Event Metadata 116. As described in more detail below, the structure and transmission of Event Metadata 116 implicitly or explicitly associates it with a point in time in the Game Channel 120 audio content stream, usually corresponding to sometime shortly after the Key Event was identified by operator or automated process 104. Other channels 122, and optionally additional types of metadata, can also be broadcast or otherwise transmitted to receivers 14.

As shown in FIG. 1, playback devices 14 (e.g., radio receivers) can, for example, demultiplex received audio content of the Game Channel 120, the Event Metadata 116, the audio content of other channels 122 and any metadata associated therewith. In the playback device 14, audio content of the received Game Channel 120 can, for example, be continuously cached using a modified first-in-first-out (FIFO) method. Content Buffer 112 can, for example, thus impose a defined time delay on Game Channel 120 with respect to the real-time reception of the transmitted content by playback device 14. If a user selects Game Channel 120 for listening, playback device 14 can then play the audio from the FIFO Content Buffer 112 such that the audio is delayed by the defined time period, (such as, for example, 1-2 minutes). Alternatively, if the user directly tunes to the Game Channel (i.e., by choice and not instigated by an alert), the playback device plays live content (i.e., without the delay). Other channels 122, when selected by the user for listening, are not necessarily subjected to this delay unless these channels are designated for multi-channel buffering (e.g., buffered as Smart Favorite™ channels for Tune Start™ operation, or buffered for Mix Channel operation, or as permitted by the processing and memory storage capabilities of the playback device, as described for example in the above-referenced International PCT Application No. PCT/US2012/25091, filed Feb. 14, 2012, and in U.S. patent application Ser. No. 13/531,440, filed Jun. 22, 2012).

Alternatively, in systems that employ IP streaming to a user device 14 (e.g., wherein the content is typically buffered and delayed by 2-3 minutes, for example, at the uplink and/or receiver for purposes of tolerating brief wireless link outages), no additional delay to the content for channels enabled for Key Event alerting may be required, since the Event Metadata 116 may be provided in a near-real-time manner through access to the uplink server by the receiver or, for example, through insertion in the audio content stream during uplink buffering. In this case, the channel content enabled for Key Event alerting need not be delayed differently relative to other channel content. For example, as can be typical of IP streaming services, content (e.g., audio or video) and some real-time metadata is streamed via one logical connection, but other data that changes less frequently can be polled by the receiver in a query/response transaction. A Enterprise IP Service Center or EIPSC server, for example, can be polled by the receiver 14 in a query/ response transaction to obtain data that changes less frequently than the delivered content such as general channel lineup information, electronic program guide or other information identifying what is currently playing on various channels, and so on. In accordance with an illustrative embodiment of the present invention, the receiver or user device 14 can poll a server (e.g., an EIPSC server) with some predefined query, for example, every 10 seconds or so. The query can cause a list of any active alerts to be returned to the user device, which are then be processed by the user device as described herein in accordance with illustrative embodiments of the invention. Since Event Metadata 116 can be posted to a EIPSC server repository or other server in near real-time (e.g., as soon as they are identified), it effectively precedes the corresponding program content (e.g., audio or video) by 2 to 3 minutes, for example.

When receiving Event Metadata 116 for the Game Channel 120 indicating a Key Event, the playback device 14 generates an alert (e.g., a visual and/or audible alert) to the user, notifying him that a Key Event is starting on the Game Channel, and offers the option to jump (e.g., tune) to the Game Channel. If the user accepts the option to jump to the Game Channel, the playback device 14 tunes to that channel. Because it is played slightly delayed with respect to the time of reception of the Game Channel, the user can hear the building play action leading to the Key Event. As illustrated in FIG. 1, the Game Channel is simultaneously or currently available for transmission with the currently tuned channel, that is, the Game Channel can be transmitted on a separate stream concurrently with the currently tuned channel or provided as a multiplexed channel within the same stream comprising currently tuned channel, or the playback device 14 can switch from the stream carrying the currently tuned channel to a different stream currently carrying the Game Channel as in the case of IP streaming delivery.

FIG. 1 depicts content (e.g., channels 122 and Alert Supported Channels 120) and Event Metadata 116 being transmitted to playback devices via satellite (e.g., a satellite digital audio radio service (SDARS) system). As described below, different content delivery systems and content transmission methods can be used to transmit content and Event Metadata 116.

With continued reference to FIG. 1, the Event Metadata is shown transmitted with audio content provided via program channels (e.g., in a satellite broadcast using SDARS). It is to be understood that transmitted content is not limited to audio programming and can include video content, multi-media content (e.g., one or more of audio, video, graphics, photographs, maps and so on), and that the program channels can include any assortment of music, news, talk radio, traffic/weather reports, comedy shows, live sports events, commercial announcements and advertisements, and so on.

As described in more detail below, Event Metadata 116 can be transmitted in-band with the content (e.g., via a Broadcast Information Channel or BIC message described below) or out of band. For example, Event Metadata 116 can be provided in one of several multiplexed channels that are streamed or broadcast to playback devices 14, or broadcast via out-of-band signaling. It is also possible to broadcast content to a playback device or radio receiver 14 but use a 2-way or 1-way unicast or a multicast IP channel for receiving out-of-band metadata. For an IP implementation, an EIPSC service can be employed, for example, to get current Key Event tags (e.g., polling every 10-30 seconds) or Event Metadata as described above.

Illustrative Scenario for Generating Event Alerts

FIG. 2 illustrates a portion of a few channels of content that is being broadcast or otherwise transmitted to a playback device 14 (e.g., radio receiver). As noted, playback device 14 can be operable to receive multiple channels simultaneously, and/or receive only one of these channels at a time and switch among different channels (e.g., as in the case of IP streaming of content). Each of the four channels shown in FIG. 2 provides different content, with Channel 22 broadcasting a news program, and each of Channels 33, 44, and 55 respectively broadcasting a different live sports game, GameA, GameB, and GameC. The blocks in each of the games labeled Play1, Play2, and Play3 represent a Key Event (e.g. a scoring run for a baseball game) in a game or other sporting event. The "star" symbol within the block represents the time at which the actual Key Event occurs (e.g., a runner crossing home plate in a baseball game). For example, Time T1 for Play1 might represent the actual scoring run, while the time from Time T1a to Time T1 represents the at-bat time for the batter hitting the run, and the time from Time T1 to Time T1b represents the post-score action and color commentary. Most listeners want to hear all the audio from Time T1a to Time T1b to get the most enjoyment from the scoring event occurring at Time T1.

In the example that follows, a "Casual Fan" is monitoring the progress of GameA, but in the meantime is also listening to the news on Channel 22 at Time T0. An advantage of the Key Event alert operation for this listener is that she can be alerted about Key Event Play1, for example, enough time in advance to enable her to tune to Channel 33 to hear the entire Play1 from Time T1a through Time T1b. In contrast with a "Casual Fan," a "Sports Enthusiast" may be monitoring progress of all three games on Channels 33, 44, and 55. At Time T0 this listener is tuned to Channel 44, listening to GameB. The advantage of the Key Event alert operation for this "Sports Enthusiast" listener is that he is alerted sufficiently in advance to enable him to hear the full action for each of Play1, Play2, and Play3, namely, times Time Tna through Time Tnb for n={1,2 and 3}, even though they are on different channels.

Entry and Transmission of Event Metadata for Key Event

Figure 3:
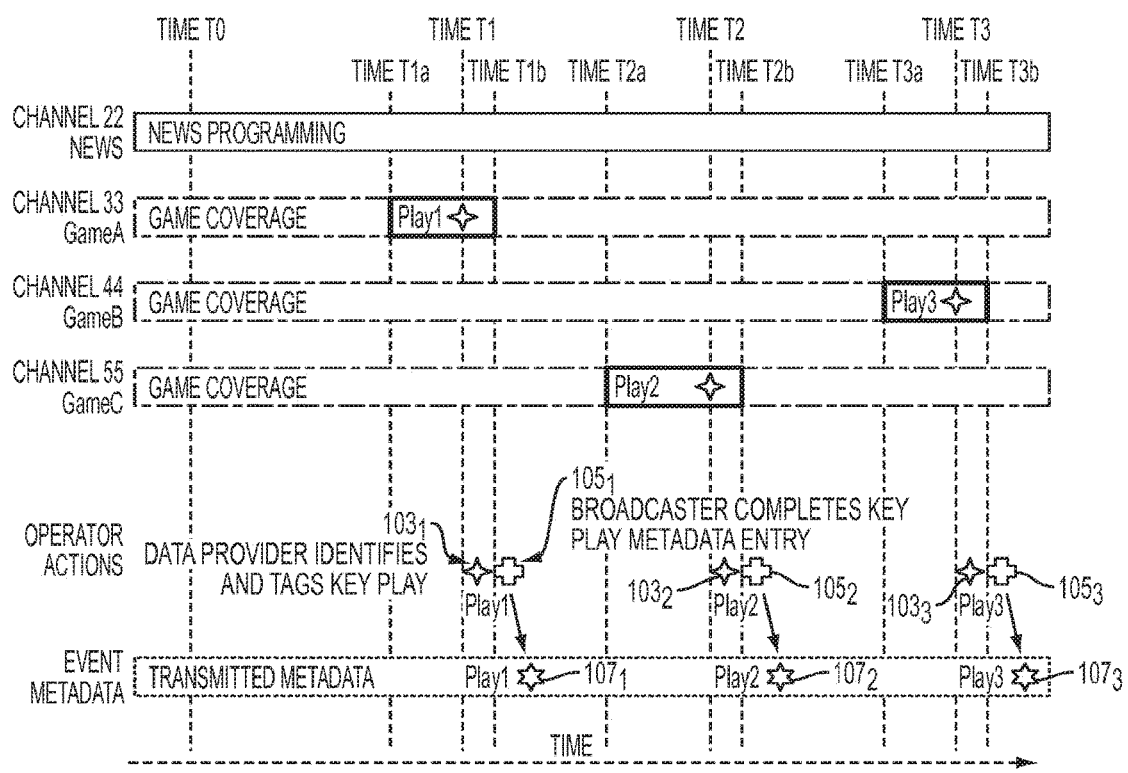
FIG. 3 depicts the broadcast or streamed channels of FIG. 2 with Event Metadata entry in accordance with an illustrative embodiment of the present invention.

FIG. 3 expands upon the example of FIG. 2 by illustrating the addition of Event Metadata 116 for Key Events by the operator or other monitoring entity or service 104, and the resulting transmission of the Event Metadata 116 with respect to the channel 120 comprising the corresponding audio or other content for delivery via broadcast or streaming or other transmission mode. FIG. 3 illustrates, for each PlayN, some delay from the time a Key Event occurs in the audio program, live event or other program 102 (e.g., is played in real-time) to the identification of the Key Event or at least generic event data by the operator, data provider or other monitoring entity or service 104 as indicated at 103, to the completion of the associated Event Metadata 116 entry by that operator or monitoring service 104, or the broadcaster or content provider 20, as indicated at 105, and to the queuing of the Event Metadata 116 into the transmission as indicated at 107. This delay accommodates human reaction and interpretation time (i.e., a determination by an operator or monitoring system 104 of what event actions constitute matches for designated generic metadata, or constitutes a Key Event) and does not create any issues for the implementation of the Key Event alert operation in accordance with illustrative embodiments of the present invention as discussed in more detail below.

FIGS. 1 and 3 depict an illustrative embodiment of the present invention wherein a game data provider 104 identifies and reports information about a game 100 as shown at 103. The game data is then conveyed to broadcaster 20. The broadcaster 20 or subsystem, in turn, analyzes the game data and, if it is indicative of a Key Play, creates a corresponding Key Play metadata entry as shown at 105 that is then transmitted as shown at 107. In accordance with another illustrative embodiment, the playback device 14 can receive generic sports data (e.g., as generated by a third party data provider such as STATS, Inc.), analyze it to determine if a Key Event has occurred (e.g., based on defined criteria), and, if so, which channel would be applicable (e.g., based on the teams involved, cross-referenced with PID data indicating what teams are playing on what channels). In other words, the function of a subsystem 108 in FIG. 1 can be effectively moved from the uplink (e.g., broadcaster or content provider 20) into the playback device 14. This has the advantage that, if the receiver is already receiving the sports data (i.e., in support of some sports data service), the entire service could be implemented with only receiver software.

Relationship of Received Event Metadata and Channel Playback at Receiver

Figure 4:
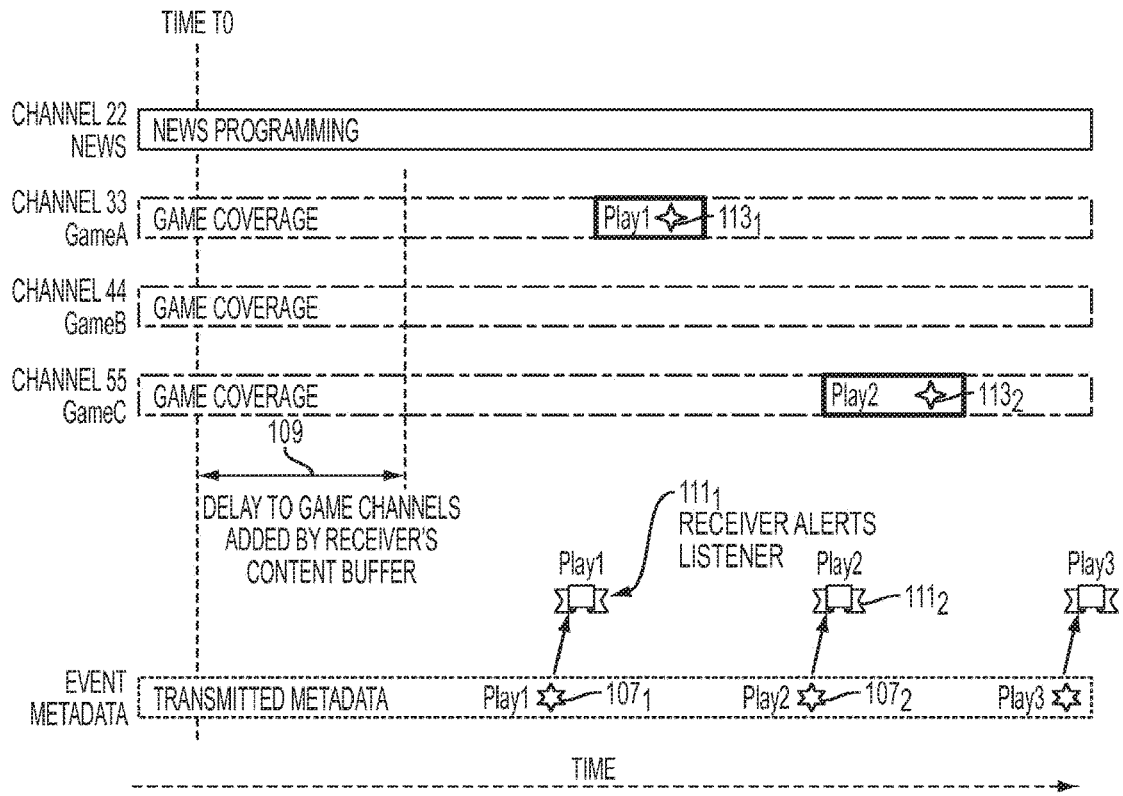
FIG. 4 depicts the broadcast or streamed channels of FIG. 3 and the relationship of Event Metadata with radio receiver/user device channel playback in accordance with an illustrative embodiment of the present invention.

FIG. 4 expands upon the example of FIG. 3 by illustrating the relationship of Game Channel 120 audio play in the radio receiver 14 wherein the delay 109 introduced by routing the Game Channel 120 audio through the Content Buffer 112 is factored in. For example, as illustrated at 113 in FIG. 4, playback of PlayN from the Content Buffer 112 now occurs after its corresponding Event Metadata is transmitted as indicated at 107. Alternatively, as explained above, the delay can be introduced for all channels at the uplink (e.g., such as in a content delivery system that employs IP streaming). Processing and play of the non-game News channel 22 and the Event Metadata 116 stream can remain in real-time (i.e., subject to normal system end-to-end delays involved in transmission, reception, and decoding of the content, and whether operations employing multi-channel buffering are used such as Tune Start™ Mix Channel or Tune Mix™ operations). However, since the Game Channels are played in a delayed manner, the Event Metadata 116 can be processed before corresponding Key Events 113 on the Game Channels are heard by the listener. This allows the playback device or radio receiver 14 to generate an alert 111 to the user in time to allow the user to jump to the Game Channel 120 with sufficient lead time to hear any preceding play action that unfolds into the Key Event as determined by the operator or monitoring service 104 that entered the metadata for that Key Event.

Generally, most listeners are not aware that many "live" broadcasts are already subjected to some delay due to transmission, encoding, editorial review, and so on. For example, most "live" transmissions over satellite radio are already delayed around 20 seconds from the time the audio feed is provided to the broadcast center or content provider 20. Since the user is unaware of the small delay added to the Game Channel 120 audio play by the receiver 14, the receiver 14 appears to the user to have been able to "predict" that a Key Event will occur. A casual fan or user is able to listen to news, for example, and occasionally tune to a Game Channel of interest just in time to hear the most exciting highlights (e.g., Key Events) of the game. A sports enthusiast can monitor multiple concurrent games, switching between various alert supported Game Channels in time to hear the best (e.g., Key Events) of each game or sporting event or program. Thus, the system and method described herein in accordance with exemplary embodiments of the present invention address the disadvantages of conventional content delivery systems described above and realize a number of advantages.

The following sections provide more detail and alternative implementations for the illustrative methods and components described above.

Illustrative Processing of Event Metadata at Playback Devices

As stated above, the structure and transmission of the Event Metadata 116 implicitly or explicitly associates it with a point in time in an Alert Supported Channel (e.g., Game Channel 120). For example, the Event Metadata can simply contain only a reference (e.g., a channel identifier) to an Alert Support Channel 120 (e.g., the channel broadcasting the game). When the playback device 14 receives this Event Metadata, it can assume (e.g., in accordance with a default setting or previously established convention, rule or policy implemented at the playback device 14) that the play action that leads to the Key Event corresponding to the Event Metadata occurs at some fixed time (e.g., 2 minutes) before the live broadcast point of the referenced channel. If the user elects to switch to an Alert Support Channel in response to an alert, the playback device 14 can then determine the playback point from which to start play from the buffered Alert Support Channel in the Content Buffer 112 as 2 minutes preceding the content that is being broadcast or otherwise transmitted when the Event Metadata that corresponds to the displayed alert is received.

In some content delivery systems, channel metadata is provided (e.g., Program Associated Data (PAD) in an SDARS system) that includes song name or segment label (e.g., event type such as a game or concert), name of performer (e.g., artist, sports team, commentator name, or performing act at a concert or other live program), service ID (SID), and program ID (PID), among other data. The service ID can identify service channels of a particular content provider such as Top Tracks, CNN News, The Comedy Channel, and the like, and is used identify the specific service channel at the receivers 14. The program ID comprises data relating to the identity of a unique content segment such as a song on a specific CD or identifiers of the teams engaged in a sporting event broadcast, for example. Thus, with such rich metadata, mere reference to a channel number in an alert is sufficient information to allow a playback device 14 to determine which game and therefore which teams are involved, since other existing channel metadata processed by the playback device 14 identifies whether a channel is or is not broadcasting a game, and which teams are involved in the game.

In accordance with another example of an implicit association between the Event Metadata and the buffered playback point in the Alert Supported Channel, the Event Metadata 116 can also comprise an event type code, which is then used by the playback device 14 to perform a look up operation using a table of time offsets wherein some kinds of events (e.g. a home run) might have different assumed time offsets for the buffered playback point than other kinds of events (e.g. a score turnover for basketball). In other words, if the playback device 14 receives Event Metadata indicating a home run, the playback device may determine the buffered playback point for the Alert Supported Channel providing that baseball game to be 1.5 minutes. If the playback device 14, however, receives Event Metadata indicating a turnover in a basketball game, the playback device may determine the buffered playback point for the Alert Supported Channel providing that basketball game to be 55 seconds.

In accordance with an example of an explicit association between the Event Metadata and the playback point in the Alert Supported Channel, the Event Metadata can include a time value, which is then used by the playback device 14 to calculate the starting playback point from the buffered data in the Content Buffer 112 based on the live broadcast time minus the time value. The time value could be an actual time (e.g., number of seconds), or could be a table lookup value (e.g., an index into a table of standard time offsets). The time value or playpoint values can also be user-programmable or user-defined, can vary depending on the channel or event-type, can be provided to the receiver or user device 14 as default settings, can be transmitted to and therefore updated at the receiver or user device 14, among other implementations. In accordance with another example of an explicit association, the Event Metadata could include a time code reference, such as the frame ID for the satellite broadcast, or time code in hours/seconds since midnight, and so on. This approach may require more Event Metadata 116 but can be advantageous over implicit methods. For example, this approach can more consistently reference the starting buffered playback point of the event since it is unaffected by delays in the reception of the metadata, which can introduce small errors in the timing when using implicit methods.

As stated above, event data such as sports event data can be obtained in near-real-time from a third party service provider such as STATS, Inc. Event Metadata 116 can be generated automatically using such third party data. For example, a content provider 20 can implement software code at the uplink or elsewhere in the content delivery system 10 to filter such third party data to select designated types of the data (e.g., a score change in a baseball game, but not a strikeout or fly ball out) to generate an Event Metadata 116 message. Thus, the content provider 20 need not employ any human operator 104, but rather the trigger data can be obtained solely from third party data that is automatically filtered by software to generate Event Metadata 116.

The timing relationship described above can work similarly for third party generic event data. As an example, a third party sports data provider such as STATS, Inc. sends near real-time data of a sports score change in a baseball game to a content provider 20. The content provider 20 can assume this score change occurred within the last 10 seconds or so, and immediately transmits Event Metadata 116 using any of the methods described above. It is to be understood that the time association does not have to be precise to support the Key Event Alert function. For example, if a generic event data service such as STATS, Inc. provides a score change for a game that the content provider 20 is broadcasting or otherwise transmitting, then sending a corresponding Event Metadata 116 message and using an implied offset (e.g., a 2 minute offset) allows the user hear and/or see the play action leading up to the score change. Accordingly, the Key Event Alert function can be easily implemented for IP-delivered services (e.g., streaming audio services), since the audio for such services is often necessarily buffered for 2 to 3 minutes to tolerate dropouts and delays. Thus, the time shifting of the audio needed for Key Event Alert operation is already built-in for IP-delivered services.

Implementation alternatives for generating Event Metadata from the third party event data can include at least one of the following, among other alternatives: a Generic Event broadcast with time offset implied when received by the playback device 14; an Event broadcast with some kind of event type ID (e.g., based on or derived from what is received from the third party) that then can be used to generate different time offsets for different event types; the content provider 20 converting the "implied" time offset from the received third party event data into explicit time offsets; or time code values included in the Event Metadata 116.

Entering Event Metadata

In accordance with illustrative embodiments of the present invention, multiple techniques can be used for establishing the Event Metadata 116 associated with a Key Event in a program or other delivered content, depending on metadata encoding/transmission objectives, the alert capabilities of the receivers/playback devices 14, and the acceptable levels of burden placed on an operator 104 entering the metadata. In an illustrative embodiment of the present invention, an operator or agent 104 who hears a Key Event during the game can press a button on a console or other device, thereby tagging the event. No other information need be entered by the operator. Event Metadata 116 generated using such a tag can, for example, be combined with the audio transmissions (or other content transmission, depending on the type of content and mode of delivery in use), with an assumed fixed timing relationship between the reception of the Event Metadata and the corresponding Alert Supported Channel broadcast when detected by the radio receiver, factoring in relative broadcast center processing, encoding, and uplink delays. The playback device 14 can alert the user of the impending Key Event, factoring in the known timing relationship, plus a fixed time before the event will occur that allows the user to hear the action building to the play (e.g., 15 seconds). Thus, the alert is generated by the playback device 14 some amount of time (e.g. 15 seconds) before the point in the delayed Alert Supported Channel that corresponds to when the operator 104 pressed the "tag" button (e.g., or a monitoring system designated the event as a Key Event).

In an alternate implementation, the operator 104 can supplement the "tag" entry with further information characterizing the Key Event, including but not limited to any of the following:

Associated Channel Identifier, identifying the audio channel on which the Key Event occurs.

Type of Key Event: for sports programs, key events can include, but are not limited to, score, stolen base, goal attempt, outstanding play, kickoff, field goal, interception, fumble, hit, penalty, and so on. For other types of programs, a key event can be a breaking news story, or an expected piece of a breaking news story such as a change in category level for a tropical storm or hurricane being covered by a weather channel, or a verdict or interview with prosecution or defense team members in a trial being covered by news media, for example.

Time Duration before the "tag" event during which play action will be of interest to the user. e.g. 15 seconds, 1 minute, etc. Alternatively, this value can, for example, be automatically assigned, or assigned a default value that is based on the Type of Key Event or Type of Channel or genre of content (e.g., news, weather, and so on) or other factors such as the type of sport being played and that can be overridden.

Time Duration after the "tag" event during which play action or commentary will be of interest to the user, e.g. 15 seconds, 1 minute, etc. Alternatively this value can, for example, be automatically assigned, or assigned a default value that is based on the Type of Key Event or other factors such as the type of sport being played and that can be overridden.

Priority of Key Event, e.g., high (e.g., scoring events), medium (e.g., turnovers, penalties, etc.), and low (at bats, stolen base, failed goal kick, etc.) as classified by the broadcaster or content provider 20 (e.g., according to defined criteria). Alternatively, this value may be automatically assigned, or assigned a default value that is based on the Type of Key Event and that can be overridden.

The Key Event can also be generated and entered with automated monitoring methods not requiring human intervention (e.g., monitoring other data sources such as score changes, game statistics changes, and the like, and/or performing video source analysis, and/or performing crowd noise analysis, and so on using software).

In accordance with another illustrative embodiment of the present invention, additional types of metadata can be provided. For example, where content delivery includes multimedia or video programming, metadata can comprise photos or graphics. For example, for breaking news or political news programs, names of selected news commentators or political candidates or elected officials, and/or their photographic image (e.g., thumbnail image) or other icon can be sent as metadata. Such additional metadata can be manually typed, selected from a pre-built selection list, selected from a set of pre-assigned buttons, among other methods available for console user interfaces.

In an alternate implementation, an operator's console application can allow post-entry "shifting" of the tag event by some small operator-specified or selected time to accommodate instances where the main event of the Key Event was not evident until sometime after it had occurred.

In an alternate system implementation, the Event Metadata 116 can be generated by an entity outside the broadcaster 20, e.g., by the supplier of the live audio content, or the responsibility of Event Metadata 116 can, for example, be shared between the broadcaster or content provider 20 and a third party entity.

Encoding, Transmitting, and Receiving Metadata

In accordance with illustrative embodiments of the present invention, Event Metadata 116 for one or more corresponding Alert Supported Channels can be conveyed from the broadcaster 20 to the receiver/playback device 14 using multiple alternative techniques. For example, the Event Metadata 116 can be encoded directly into the content stream, or transmitted as a separate multiplexed data stream with the content, or provided via conveyance to the radio receiver/playback device 14 separate from the content. Further, the content can be transmitted to the playback device 14 via one transmission mode and/or transmission link, and the Event Metadata 116 can be transmitted to the playback device via a different transmission mode and/or transmission link. By way of an example, the playback device 14 can comprise an SDARS or other type of broadcast receiver for program channels, as well as components for supporting a 2-way IP channel for receiving Event Metadata. As noted above, the Event Metadata 116 can be transmitted on a one-way channel once or periodically or simply automatically resent once, provided sufficient delay exists between the last occurrence of the metadata and the content to be played back. In the case of a 2-way link for receiving metadata, the playback device 14 can periodically request or poll for Event Metadata from a metadata source.

In illustrative embodiments of the present invention, the user playback device 14 can, for example, be configured to review received Event Metadata to determine the Alert Supported Channel to which it corresponds, and then generate an alert if any Event Metadata has been received for any such Alert Supported Channels specified for that user. As described below, the channels for which alerts can be generated can be specified by a user (e.g., user configuration settings), or, for example, can be automatically determined for the user based on default settings of the content provider (e.g., a designated group of channels such as a group of sports channels), or by historical channel selection of the user as determined by one or more user device algorithms (e.g., channel or program suggestion algorithms). These same criteria for alert generation can also be used to determine which Alert Supported Channels 120 are to be buffered in Content Buffer 112. The playback device 14 can be optionally configured to not receive Event Metadata 116 from certain sources, or for selected Alert Supported Channels, depending on user preferences.

The ability to generally convey metadata associated with content is known for many broadcast and streaming services 10. In accordance with an aspect of illustrative embodiments of the present invention, playback device 14 can comprise means to associate received Event Metadata 116 with a corresponding point in time within its associated content channel. As stated above, in an illustrative implementation, the Event Metadata/content channel timing relationship can, for example, (i) be implied on receipt, or (ii) be directly associated with a content frame or other substructure simultaneously received, with an optional fixed or variable time offset. In an alternate exemplary implementation, Event Metadata can include a time code field, which resolves to a particular time, frame, or other substructure within the associated content channel. For example, a Frame Counter can be used for this time association in a SDARS implementation.

Illustrative User Interfaces for Receiving Event Alerts

Figure 5:
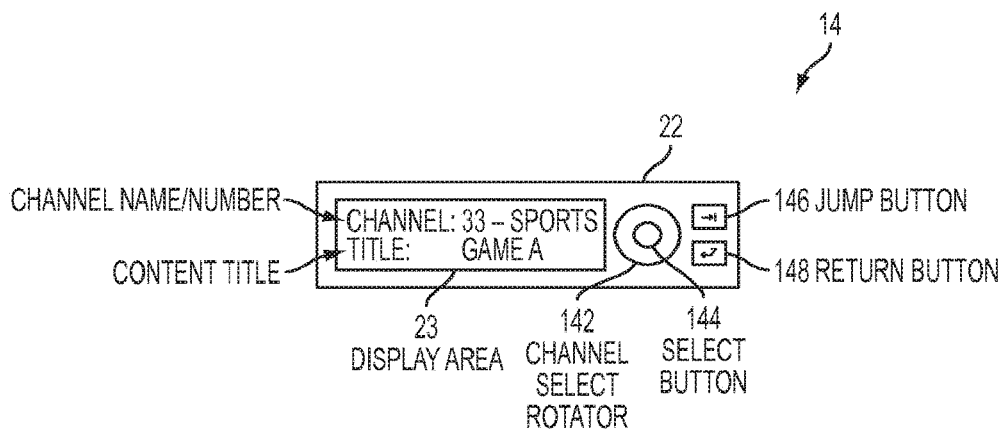
FIG. 5 depicts an example of a user interface for a radio receiver or user device configured with a Key Event alert function in accordance with an illustrative embodiment of the present invention.

FIG. 5 depicts an example of a user interface 22 for a radio receiver or other user playback device 14 that allows the user to select a channel for listening in accordance with an illustrative embodiment of the present invention. In this specific example, the user can view the channel number and name of the current channel, as well as the title of content currently playing on a display area 23. The user may also select a different channel by rotating the Channel Select Rotator 142 and then pressing the Select Button 144 when the name of a channel of interest is displayed. A Jump Button 146 and a Return Button 148 are provided to support responses to alerts provided by the Key Event alert function. FIGS. 6 through 16 depict a series of illustrative screens that can be generated on display area 23 of a user device 14 constructed in accordance with another illustrative embodiment of the present invention.

These specific examples of a playback device 14 and user interface 22 presented in FIG. 5 and FIGS. 6-16 are for illustrative purposes. It is understood that user interface 22 can show more or less information about the current channel and playing content; that there can be more or fewer buttons; that different controls and methods can be provided to locate and select alternate channels; that different controls and methods can be provided to support Jump and Return functions; that controls for functions such as Jump and Return may be displayed and selectable only which such functions are meaningful for selection by the user; and that the specific complement and arrangement of buttons and display elements can vary greatly as between different types of playback devices 14 configured with the Key Event alert function in accordance with illustrative embodiments of the present invention.

Figure 6:
FIGS. 6 through 16 depict user interface screens for Key Event alerts and corresponding channel navigation in accordance with an illustrative embodiment of the present invention.

The display area 23 can, for example, be a graphical user interface on which soft buttons and alerts are generated, as well as displays of information relating to the channel number and channel title and/or logo of the currently selected channel, and title of content segment or track currently being played back to the user. For example, FIG. 6 depicts a screen showing channel 115 or "CNN" as the currently selected channel on which the program "John King USA" is currently playing. Soft buttons are provided for skip forward, pause, and skip backward. An optional indicator shown as "LIVE" and a corresponding time (i.e., −2:34 minutes) indicate the delay from the current playback point to real-time reception of the transmitted stream.

Figure 7:
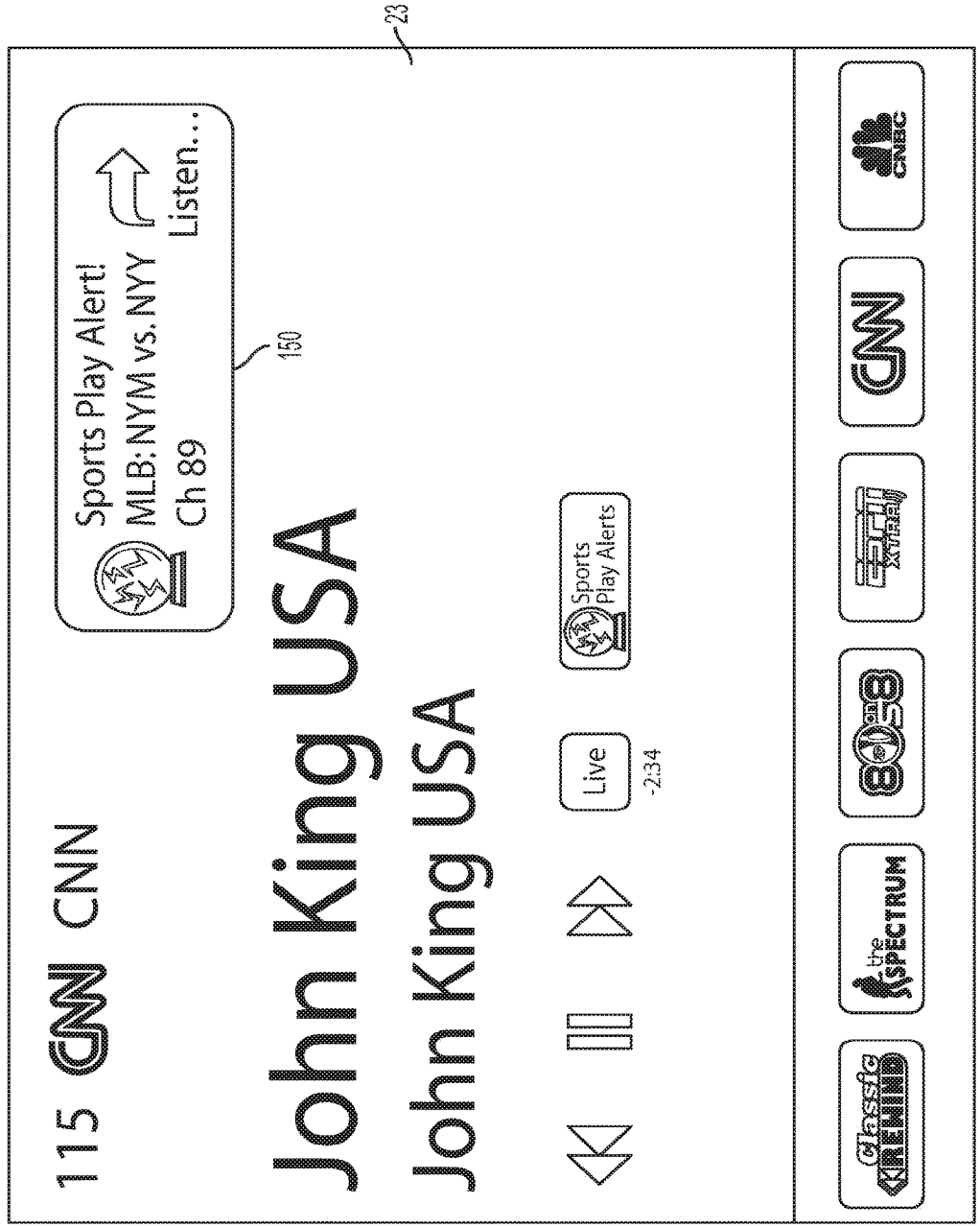

As shown in FIG. 6, another optional indicator (i.e., "Sports Play Alerts") indicates to the user that the receiver 14 is configured to provide Key Event Alert operation. For example, the indicator "Sports Play Alerts" can be highlighted or otherwise illuminated differently when Key Event alert operation is enabled, and either not shown or not highlighted when Key Event alert operation is not enabled. When Key Event alert operation is enabled, the playback device 14 processes received Event Metadata 116 provided for one or more Alert Supported Channels received from one or more content delivery sources. When a Key Event has occurred as indicated by the corresponding received Event Metadata 116, the playback device 14 generates an alert 150 (e.g., "Sports Play Alert ! MLB: NYM vs. NYY Ch 89 Listen . . . "), as illustrated in FIG. 7. Further, depending on the processing and memory capabilities of the playback device 14, designated Alert Supported Channels (i.e., selected sports channels, or channels providing live coverage of selected events) for Key Event alert operation can be stored in the Content Buffer 112 when the Key Event alert operation is enabled; otherwise, the capacity of the Content Buffer 112 can be used for other types of operations or features when Key Event alert operation is not enabled. As stated below, the playback device 14 can also maintain designated channels such as Alert Supported Channels in the Content Buffer 112 regardless of whether Key Event alert operation is enabled or not.

Figure 8:
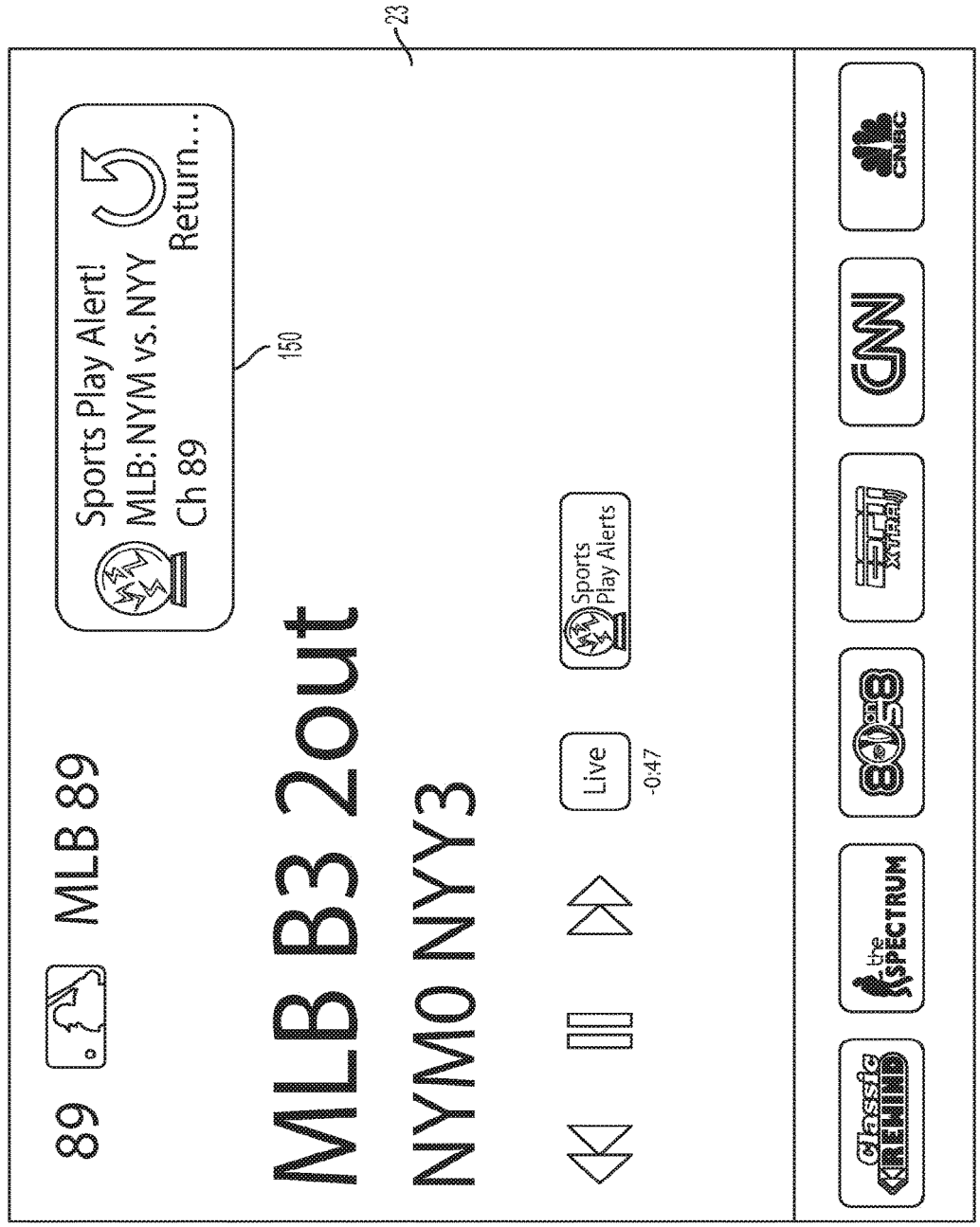
Figure 9:
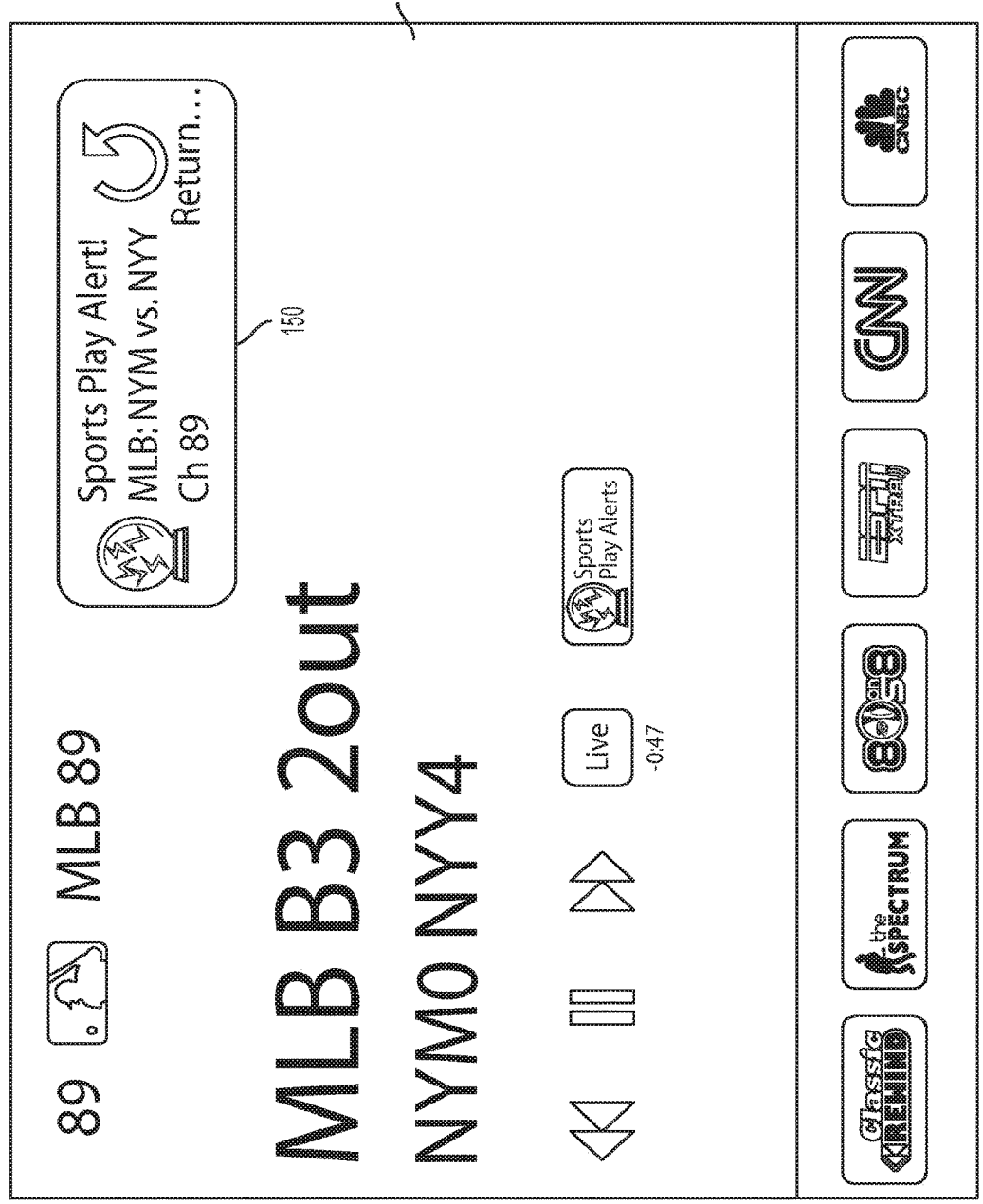
Figure 10:

With reference to FIG. 7, the alert 150 can be programmed as a soft button to change the playback channel from channel 115 to channel 89 in response to the user depressing the soft button 150 or other soft button in the display area 23 shown, or operating a jump button as indicated in FIG. 5 or other button, dial or input device on the user interface 22. As shown in FIG. 8, the playback device is now tuned to channel 89 and the current track (MLB: NYM vs. NYY) has a score of NYM 0, NYY 3. The user can listen to the play(s) or action leading to the Key Event as indicated by the "Live" indicator at time −0.47 seconds delayed from real-time reception. As indicated in FIG. 9, the Key Event is a score, as indicated in the display area 23 (e.g., NYM 0, NYY 4). With reference to FIGS. 8 and 9, the alert 150 provides a "Return . . . " versus "Listen . . . " option, such that the user can select the soft button and quickly return to channel 115, as indicated in FIG. 10.

Figure 11:
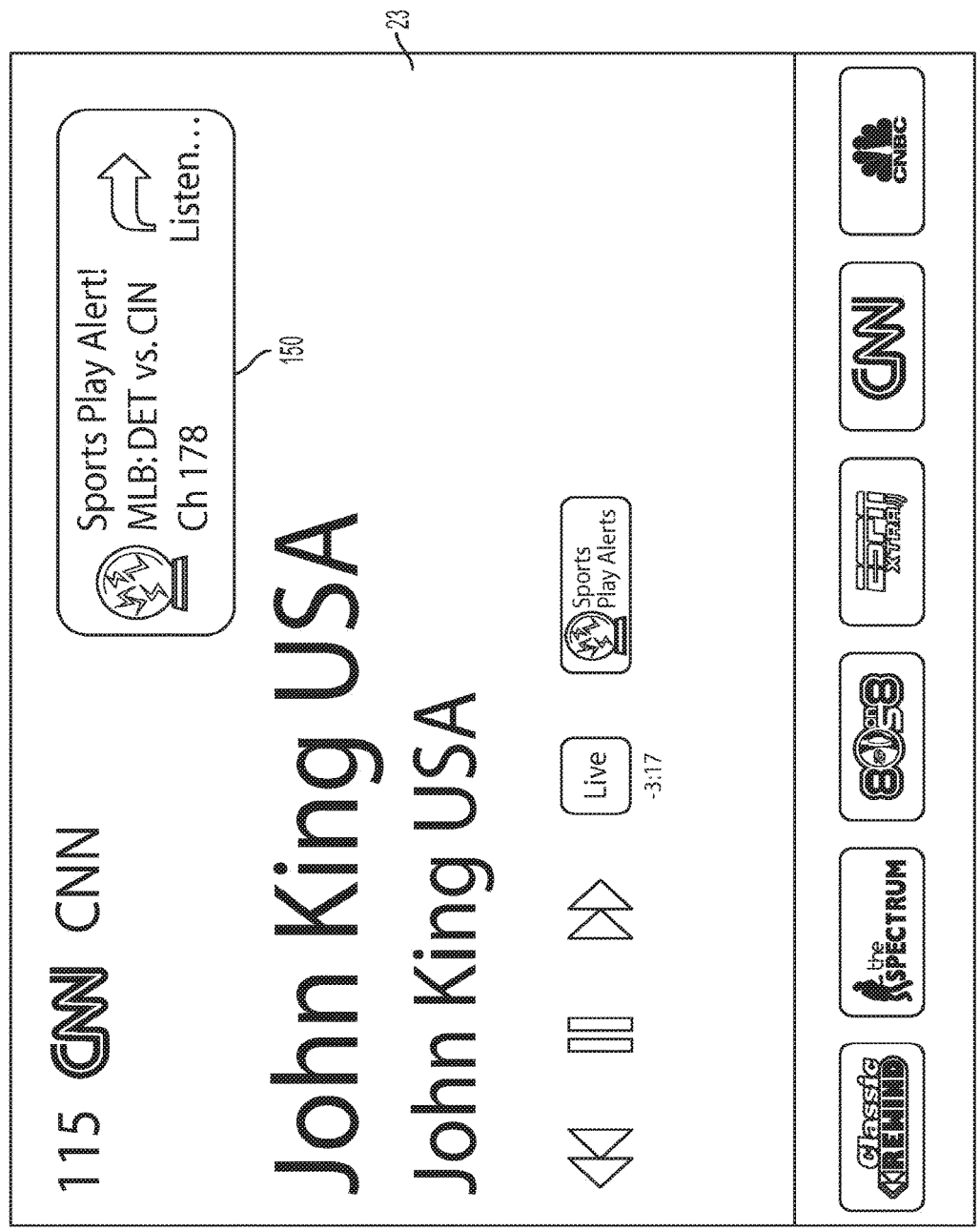
Figure 12:
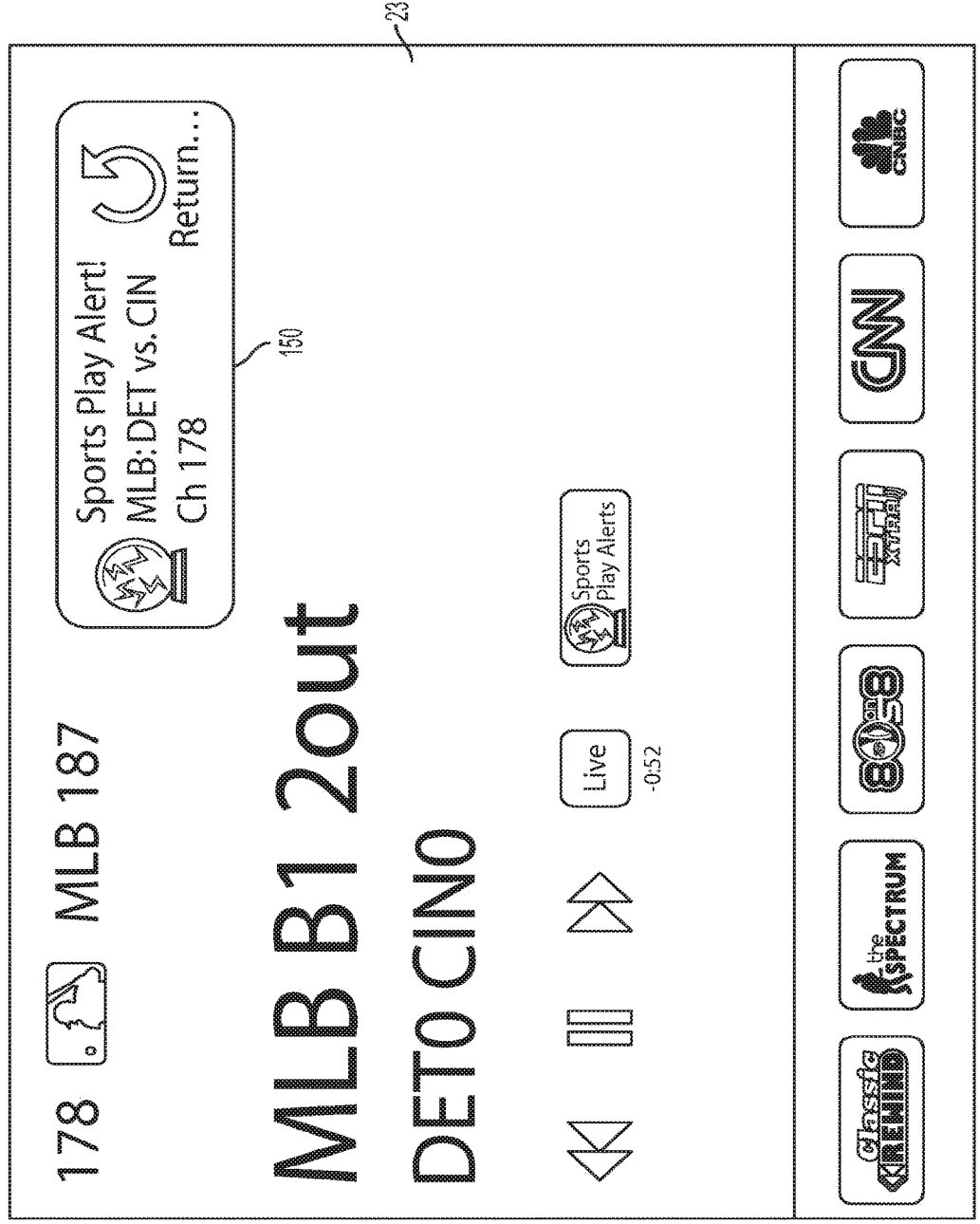
Figure 13:
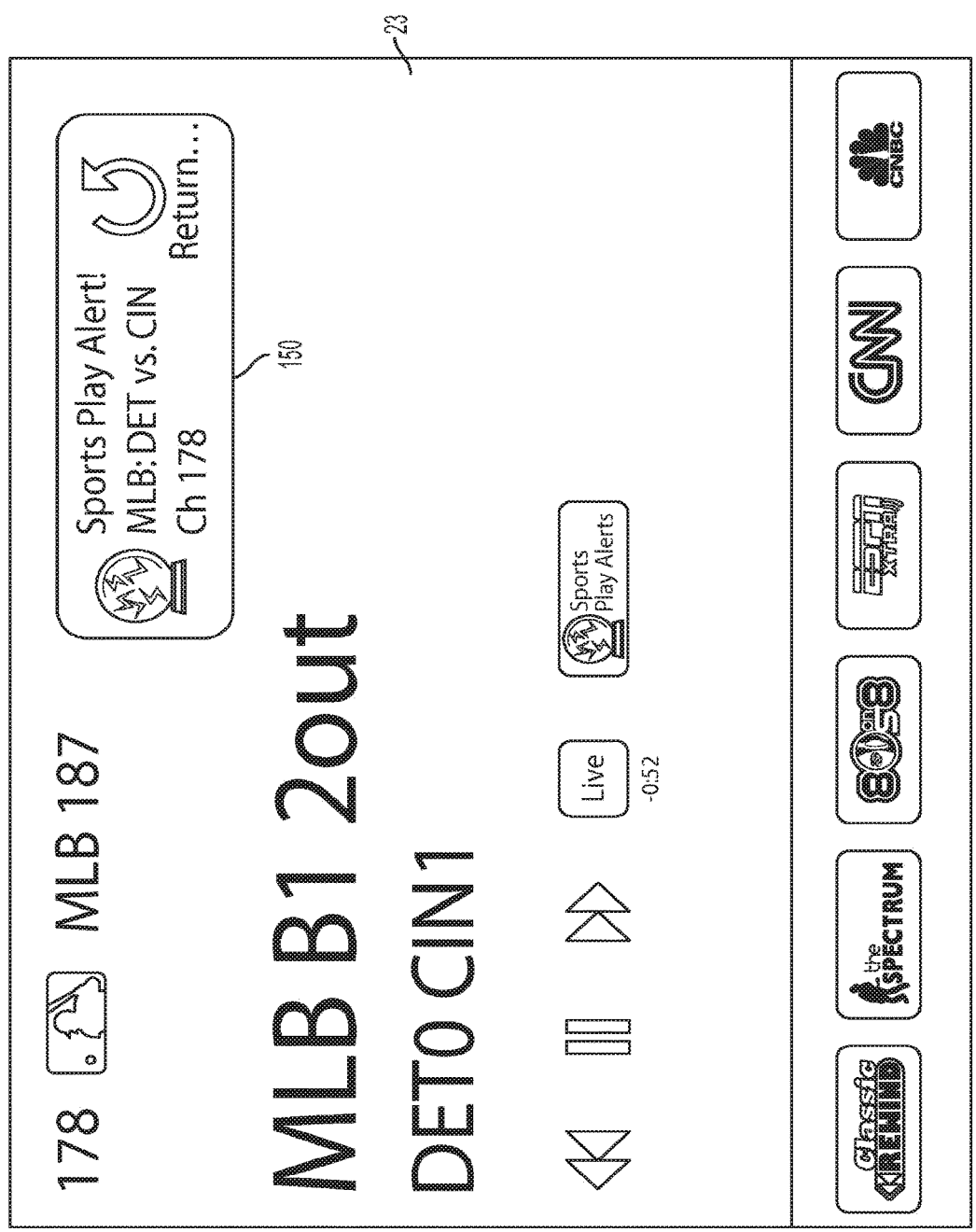

With reference to FIG. 11, another alert 150 (e.g., "Sports Play Alert ! MLB: DET vs. CIN Ch 178 Listen . . . ") has been generated indicating that a Key Event has occurred in another game on a different Alert Supported Channel according to its corresponding Event Metadata 116 received by the playback device 14. The optional indicator "LIVE" and a corresponding time (i.e., −3:17 minutes) indicate the delay from the current playback point to real-time reception. The playback device 14 can be programmed to change the playback channel from channel 115 to channel 178 in response to the user depressing the soft button 150 or other soft button in the display area 23 shown, or by operating a jump button as indicated in FIG. 5 or other button, dial or input device on the user interface 22 in response to the alert 150. As shown in FIG. 12, the playback device is now tuned to channel 178 and the current track (MLB: DET vs. CIN) has a score of DET 0, CIN 0. The user can listen to the play(s) or action leading to the Key Event as indicated by the "Live" indicator at time −0.52 seconds delayed from real-time reception. As indicated in FIG. 13, the Key Event referred to is a score, as indicated in the display area 23 (e.g., DET 0, CIN 1). With reference to FIGS. 12 and 13, as noted above, the alert 150 provides a "Return . . . " versus "Listen . . . " option, such that the user can select the soft button and quickly return to channel 115.

Figure 14:
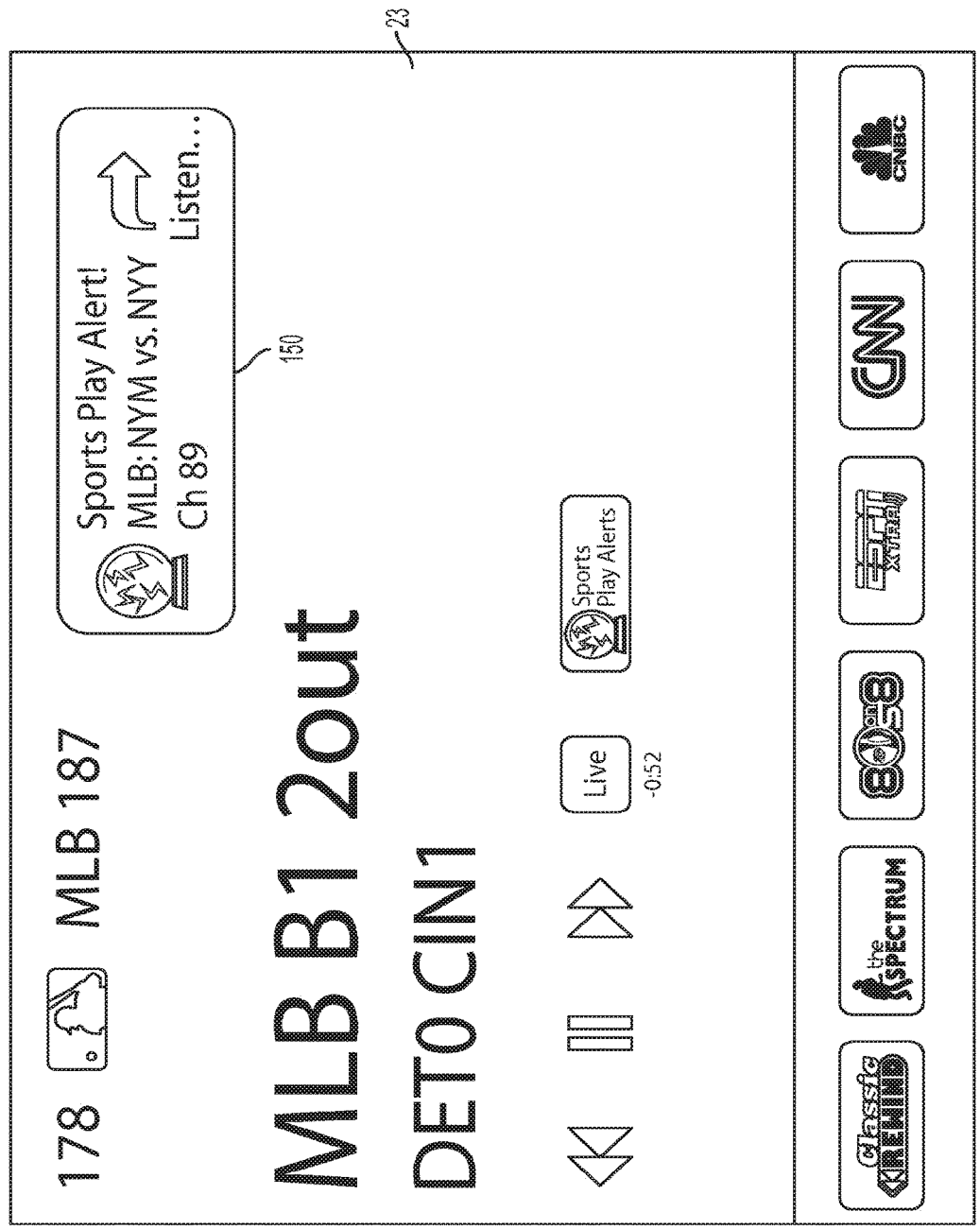
Figure 15:
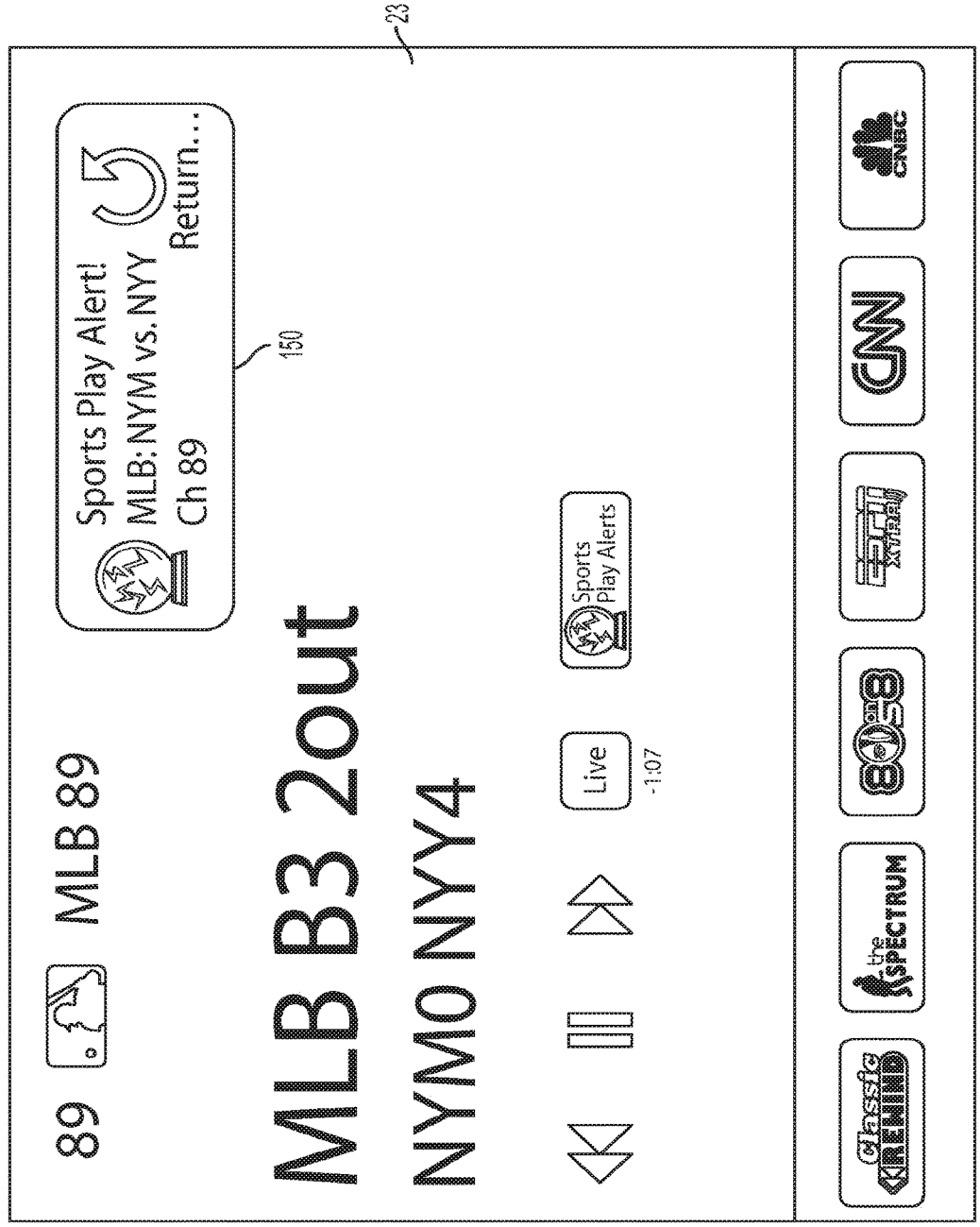
Figure 16:
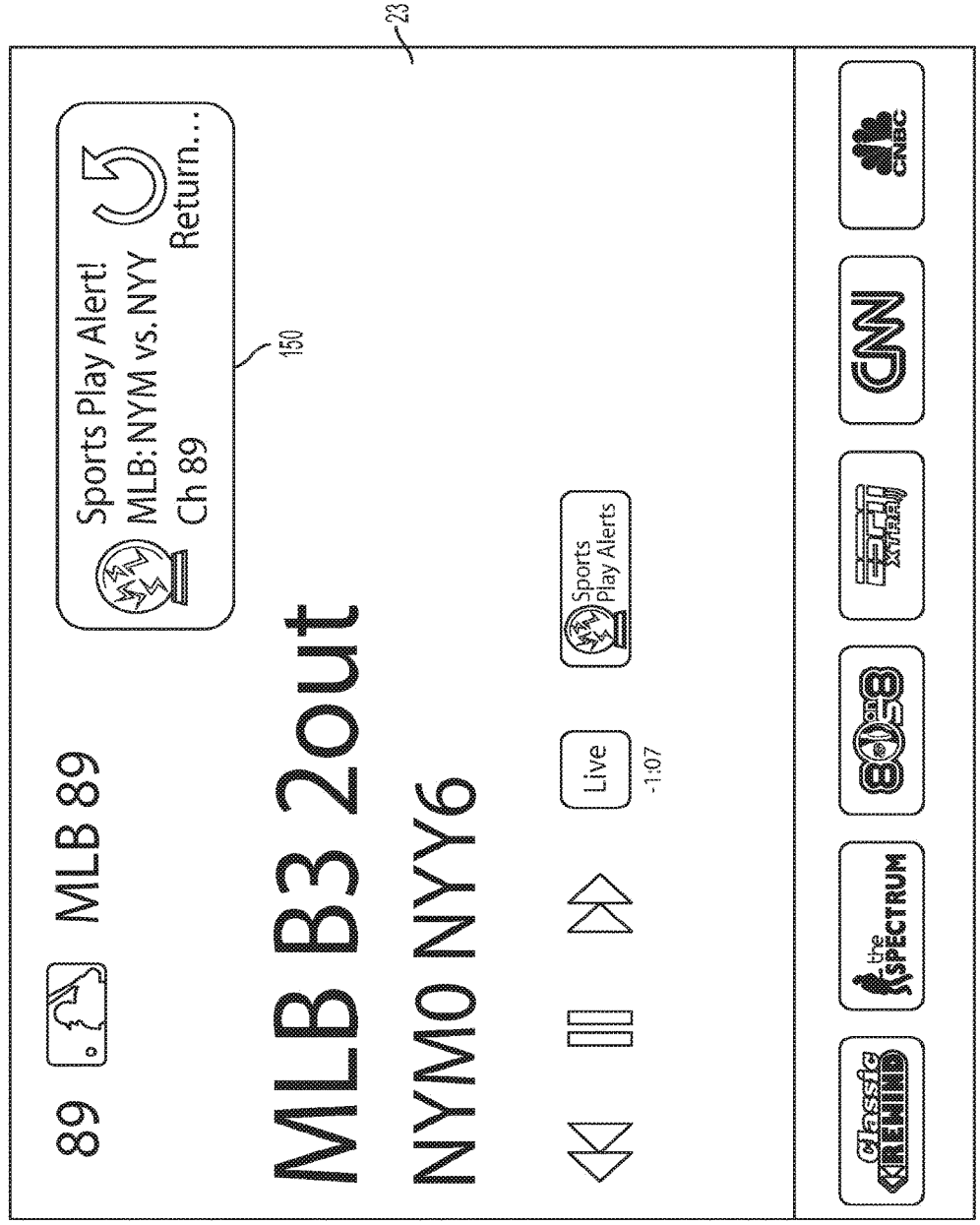

As indicated in FIG. 14, however, the alert 150 again changes (and can be optionally highlighted as compared with its presentation in the screens of FIGS. 12 and 13) to indicate another Key Event on Channel 89 (e.g., "Sports Play Alert ! MLB: NYM vs. NYY Ch 89 Listen . . . "). As shown in FIG. 15, the playback device is now tuned to channel 89 and the current track (MLB: NYM vs. NYY) has a score of NYM 0, NYY 4. The user can listen to the play(s) or action leading to the Key Event as indicated by the "Live" indicator at time −1.07 minutes delayed from real-time reception. As indicated in FIG. 16, the Key Event is a score, as indicated in the display area 23 (e.g., NYM 0, NYY 6). With reference to FIGS. 15 and 16, the alert 150 provides a "Return . . . " versus "Listen . . . " option, such that the user can select the soft button and quickly return to the previous playback channel.

In any event, as described in more detail below, the user can optionally return to the channel that was active before the alert and commence playing from where they were before switching to the channel identified by the alert if the content at the previous playpoint remains in the content buffer 112. Further, upon receiving an alert 150, a user can elect to jump to the channel identified by the alert, ignore the alert and remain on the current channel. The alert 150 can either be canceled by the user, or the playback device 14 can be configured to allow the alert to time out after a designated period of time if no jump operation is performed.

As illustrated by FIGS. 8 and 9, the display data (e.g., score change) is buffered for synchronized playback with the slightly delayed or time-shifted playback of the content on an Alert Supported Channel. For example, like Key Event content, some of its corresponding display data (e.g., fields indicating artist, title or program name, team(s), and/or game score, and the like) is also buffered for delayed playback in response to a user navigating to the channel from an alert; otherwise, the display data provides real-time values for these fields (e.g., when the user switches to a game channel without an alert). For example, the values of these fields are stored in addition to the buffered audio or video content of the corresponding Key Event channel and with pointers or references that synchronize when these values changed relative to the corresponding buffered audio or video content. Thus, when the user plays back the buffered content in response to a Key Event alert, these fields are displayed at a synchronized time relative to the audio or video.

In accordance with another illustrative embodiment of the present invention, the playback device 14 is configured to receive Event Metadata 116 or generic event data and to generate an entry for the corresponding event into a Key Event playlist, in addition to or in lieu of a generating a corresponding Key Event alert. For example, instead of immediately tuning to the channel identified by a Key Event alert, the user can listen to the Key Event by selecting it from the Key Event playlist and accessing the selected Key Event from a buffer (e.g., the Content Buffer 112) at a deferred time, which can be a significant time after the event was transmitted to the playback device 14 and added to the Key Event playlist depending on the size of the Key Event buffer. In other words, the Key Event playlist can provide a directory to a buffered channel and a selected time reference or write point therein to allow a user to access a Key Event from its buffer in response to selection of an entry in the Key Event playlist.

As described below, the size of the buffer allotted to each channel in a multi-channel buffer such as the Content Buffer 112 can be fixed or dynamically allocated. In accordance with one embodiment, the Content Buffer 112 can store at least 30 minutes of content per channel. The Key Event playlist is refreshed by the playback device 14 such that when a Key Event is no longer available in its corresponding channel buffer, its corresponding entry can be removed from the Key Event playlist. The Key Event playlist can be displayed on the display screen 23, for example, upon selection of a soft button or other input on the user interface 22 of the playback device 14.

In accordance with another illustrative embodiment of the present invention, the Content Buffer 112 buffers only about 2-3 minutes of content for Alert Supported Channel(s) in respective FIFO channel buffer(s). The playback device 14 can be configured to copy a Key Event and surrounding content (e.g., the content preceding the Key Event and optional post-event commentary) from the FIFO channel buffer to another area in RAM to allow access by the user via the Key Event playlist for some designated time (e.g., 30 minutes) after the Key Event was received by the playback device 14. Alternatively, the Key Event and surrounding content can be copied to a non-volatile memory for later perusal via a Key Event playlist.

Configuring Alert Options and Managing Channel Changes

The receiver/playback device 14 can notify the user of a Key Event and tune to the corresponding Alert Supported Channel (e.g., a Game Channel) automatically, under manual user control, or a combination of automatic and manual methods.

In an automatic implementation in accordance with an illustrative embodiment of the present invention, the receiver/playback device tunes to a corresponding Game Channel or other Alert Supported Channel based on receipt of the Event Metadata in time for the user to hear the Key Event, without requiring user intervention.

In an alternate implementation in accordance with another illustrative embodiment of the present invention, the receiver/playback device 14 produces an alert indicating a Key Event is impending. The alert may use text, graphics, an icon, an alert sound, voice, or any combination of these alert methods. The user can respond to the alert with a confirmation action, e.g., pressing the Jump button as shown in FIG. 3 to cause the receiver to tune to the corresponding Alert Supported Channel (e.g., Game Channel). If the user does not confirm desire to tune to the indicated Alert Supported Channel such as by ignoring the alert or by pressing a Return button), the playback device 14 continues to play the currently tuned channel.

The receiver/playback device 14 can also support returning to the previous channel after the Key Event has completed play on an Alert Supported Channel, for example. In one implementation, the radio receiver 14 can tune to the previously tuned channel automatically at the end of the Key Event as identified by fields in the Event Metadata. In another implementation, the user can, for example, press a Return button (as illustrated in FIG. 3) to return to the previous channel; otherwise, the radio receiver 14 continues playing the Alert Supported Channel (e.g., Game Channel) for which there was a Key Event.

In an alternate implementation in accordance with an illustrative embodiment of the present invention, the channel that was tuned before the Alert Supported Channel was tuned is automatically buffered in the Content Buffer 112 (i.e., if it is not already a designated buffered channel), so that when returning to the previously tuned channel, content play can resume where it left off.

The receiver/playback device can provide additional Key Event information when producing the alert, including but not limited to the Alert Supported Channel identifier, the Type of Key Event, the teams playing, etc. The additional information can be provided by text, graphics, icons, alert sounds, voice, or any combination of these or other methods. The receiver/playback device 14 can also offer a setup or similar user interface function to control the type of information shown; in particular some users may prefer not to be shown the Type of Key Event with the alert, to heighten the excitement of unknown play action results to follow.

The receiver/playback device can support filtering of Key Event alerts based on the Type of Key Event and/or the Priority of Key Event as conveyed in Event Metadata. For example, a user may prefer to be alerted for scoring plays, but not for other types of Key Events. As part of a setup or similar user interface function, the user can be offered the ability to indicate which Types and/or Priorities of Key Events will produce alerts and which will be ignored.

Further, different levels of user configurable options for Key Event alerting can be provided in the radio receiver/playback device 14 to allow user control over the types of alerts he or she will receive (e.g., desired types of events, and desired priorities of events) and optionally how the alerts are displayed, particularly for multiple channel alerting. Thus, the user can create a dashboard for alerts via the playback device 14 (e.g., selecting colors for alerts and positions to affect how they appear on a playback device display 23). In the case of Key Events occurring during a breaking news story being covered (somewhat repetitively) by plural news channels, a user can configure his or her playback device to alert to the channel that is covering a selected desired piece of the breaking news story such as an interview with a selected person or coverage by a selected news reporter or commentator for whom metadata has been provided. Similar preferences can be set by users with respect to plural politically-based news program channels providing commentary on the same event (e.g., elections, debates, and so on). Thumbnails for these people (e.g., commentators, reporters) can appear at the bottom of a playback device display, for example, to enable a user to avoid listening to duplicative coverage on the plural channels by tuning to specific people whose images/icons appear as alerts on the playback device display, thereby overcoming the problem of missing coverage from an interesting commentator, reporter, program guest, or news subject while surfing and listening to content on other program channels.

Buffered Channel Selection

For receivers/playback devices 14 that employ a Content Buffer 112 to support Key Event alert operation, multiple methods can be used to manage which channels are selected for buffering (i.e., "buffered channels"), depending on radio receiver/playback device content reception capabilities (e.g., the number of channels that can be received simultaneously) and storage/computation resources. In accordance with one illustrative embodiment of the present invention, all receivable channels can be buffered by the receiver/playback device 14 and therefore all are buffered channels. In alternative implementations, the playback device 14 can support buffering of only 1 Alert Supported Channel, or can support buffering of multiple designated channels (e.g., to allow support of concurrent Alert Supported Channels and the like).

For receivers/playback devices 14 that can receive a limited subset of broadcast channels simultaneously, alternate methods can be used to select the buffered channels. For example, the receiver/playback device 14 can automatically designate channels identified through channel-associated metadata as playing content supported by the present invention (e.g., the Game Channels and other Alert Supported Channels for which metadata is provided) as buffered channels, up to the maximum number of channels that can be buffered by the receiver. In another alternative implementation, the user explicitly selects which channels are to be supported by the method. For example, a user can select a favorite team via a user interface 22 on a playback device 14 that is configured to employ Game Alert operation as described in U.S. Pat. No. 7,995,673, which is incorporated by reference herein. The playback device 14 can, in turn, monitor and search received and demultiplexed channels for incoming PID changes that correspond to the selected team. In accordance with an embodiment of the present invention, the playback device 14 can be configured to commence buffering any channel located via Game Alert operation in the Content Buffer 112 and generated alerts when Event Metadata corresponding to that channel is received and indicates a Key Event. Favorite teams and leagues can also be selected by the user using menus organized by sports, leagues, and so on provided via the user interface 22.

In another alternative illustrative embodiment, the content delivery system 10 is configured to allow receivers/playback devices 14 to receive certain groups of channels simultaneously, e.g., by combining a group of channels broadcasting live sports content into a single physical Payload Channel which can be fully received by the receiver. All the channels in such a group are then either automatically designated buffered channels or are candidates for the user to select as buffered channels. If the receiver/playback device 14 is capable of receiving multiple Payload Channels at the same time, all of the channels in all of the simultaneously received Payload Channels can be designated buffered channels.

In another illustrative embodiment, the receiver/playback device 14 can, for example, speculatively select all channels in one or more Payload Channels, as long as at least one channel in the Payload Channel has been selected as a buffered channel by the user.

In another alternative illustrative embodiment, the receiver/playback device 14 can select the buffered channels without explicit user selection based on channel or content interest derived by the receiver software. For example, the receiver/playback device 14 can select buffered channels based on historical selection time by the user, e.g., buffering the channels most often selected for play by the user. The receiver/playback device 14 can also select, for example, buffered channels based on historical topic interest by the user, e.g., buffering the channels playing sports events involving teams previously identified as favorite teams by the user.

It is understood that multiple methods for selecting buffered channels can be combined. For example, the receiver may automatically select channels broadcasting events involving the user's favorite teams, while adding additional channels based on explicit user selection.

In a system where the buffering is performed at the uplink (e.g., as described above in connection with IP streaming), the various methods described herein for selecting buffered channels can also result in the receiver selecting between a buffered and non-buffered version of a channel from the uplink.

Managing the Content Buffer

Unless delayed in the uplink, for each channel supported by the method and system of the present invention, the Content Buffer 112 in the radio receiver/playback device 14 can be sized sufficiently to hold, for example, buffered content (e.g., audio content) for at least the sum of:

i. the maximum time from the Key Event tagged by the operator or event monitoring service 104 to the time the Event Metadata 116 is included in the transmission, plus ii. the longest duration of the play action preceding the tag event to be played as part of the Key Event, plus iii. additional time to accommodate alert setup time and user response time.

For example, if it takes (i) a maximum 30 seconds from the time an operator 104 hits the "tag" button to the time when all the metadata has been entered and the Event Metadata 116 is in the transmission; and (ii) at most 1 minute or 60 seconds of play action is to be aired as a prelude to an actual Key Event; and (iii) 5 seconds are needed to display an alert and give the user time to tune to the Alert Supported Channel, then the Content Buffer 112 must hold at least 95 seconds of content for each concurrently buffered Alert Supported Channel.

In one implementation, a common fixed delay can be imposed on playback of all the Game Channels or News Channels or other Alert Supported Channels when played to the user.

In an alternate implementation, the playback device 14 can dynamically vary the buffering and delay time for each Game Channel or News Channel or other Alert Supported Channel to allow the user to hear Key Events that may coincidentally air at the same time on different Alert Supported Channels. For example, while the user is listening to a Key Event on one Game Channel, the receiver may dynamically add additional buffering to another Game Channel that has a concurrent Key Event, so the user may also hear the second Key Event when tuning to the second Game Channel. The playback device 14 may also reclaim extra buffering from a further delayed Game Channel later when the user is not listening to that channel, restoring it to the nominal delay.

In an alternate implementation, the Content Buffer 112 is used to buffer Game Channels or other Alert Supported Channels and also other non-Alert Supported Channels for other purposes such as general time shifting and replay features (e.g., Tune Start™, Tune Scan™ and Tune Mix operations as described in the above-referenced International PCT Application No. PCT/US2012/25091, filed Feb. 14, 2012, and in U.S. patent application Ser. No. 13/531,440, filed Jun. 22, 2012). A playback device 14, for example, can temporarily store buffered received channels for various receiver operations such as, but not limited to, instant replay operations (e.g., rewind, fast forward, skip and pause/resume operations during real-time or near real-time playback), content preview operations (e.g., buffering channels for scanning), channel surfing operations (e.g., Tune Start™ to ensure certain types of content tracks are played from their starting points following channel changes), personalized channel operations (e.g., buffering selected channels to automatically create personalized playlists), among other receiver operations. The received channel(s) can also be stored for longer periods of time such as, for example, for recording a channel (e.g., recording a channel for a limited period of time for deferred playback).

Thus, additional buffering of an Alert Supported Channel can be supported so that, in addition to the delay buffering employed by the illustrative embodiments of the present invention, the user can also skip backwards in the cached content to hear older audio content preceding a Key Event.

In one implementation, the Content Buffer 112 can maintain a separate buffer for each channel supported as an Alert Supported Channel, for example. The number of buffered channels can be any number depending on the memory and processing constraints of the user device and the amount of memory allocated per channel. Further, multiple methods for storing and retrieving cached data into and out of the Content Buffer 112 can be used, including continuous ring buffers, fixed block allocations and linked lists, and other methods obvious to those skilled in the art.

In accordance with illustrative embodiments of the present invention, a playback device 14 can comprise a memory or at least part of a memory to implement the Content Buffer 112 as a multi-channel buffer that is managed to buffer selected received (and, in some content transmission systems, demultiplexed) channels. For example, the playback device 14 can be provided with a memory or a part of a memory that is managed by firmware to support storing content from multiple channels that have been broadcast, streamed or otherwise transmitted for buffering at least the selected received (and, as needed, demultiplexed) Alert Supported Channels, and optionally other channels such as the Smart Favorite™ channels of the currently active Tune Start™ channel configuration. A Smart Favorite™ channel is a channel designated for maintenance by a user device in a Background Instant Replay (IR) Buffer as described in the above-referenced International PCT Application No. PCT/US2012/25091.

The playback device 14 can be configured, for example, to only have a LIVE mode whereby content is stored, for example, only to volatile memory for play back substantially as it is being received. Exemplary embodiments of the different implementations of memory in the instant invention can include two modes: LIVE mode and MY RADIO mode. In the LIVE mode, the user is listening to one of the plurality of channels of the transmitted content stream in real-time or essentially as it is being received. The playback device 14 buffers at least the content from the channel to which the receiver is currently tuned. As described herein, the playback device 14 also buffers content from selected plural channels (i.e., one or more Alert Supported Channels and optionally Smart Favorite™ channels and Mix Channel constituents). In MY RADIO mode, a user is listening to content from a transmitted stream that was previously received and stored in nonvolatile memory, and the user's playback device 14 is no longer in the LIVE mode. For example, a user may select MY RADIO mode when the radio receiver/playback device 14 is incapable of receiving the broadcast stream (e.g., due to signal loss), or wishes to hear content that the user has selected for playback and is not available when the user's radio receiver is in LIVE mode.

An illustrative method for implementing the Key Event alert operation involves buffering the content received from multiple channels that have been pre-selected by or for the user, so that Key Events from Alert Supported Channels are available for selective time-shifted playback while in LIVE mode. The playback device 14 maintains a buffer (e.g., Content Buffer 112 described above), implemented with RAM (e.g., RAM 76 in FIG. 17), HDD, flash or other storage media, in which content from the buffered channels is continuously cached using a modified FIFO (first in first out) method, for example, during reception. While the buffered content can be maintained in volatile memory and therefore erased upon powering down the radio receiver or user device 14, the multiple-channel buffer can be saved in persistent memory so that content is available instantly as soon as the radio receiver is powered up.

Content buffer 112 storage may be allocated to buffered channels based on a fix amount per channel (e.g., by duration or by storage), or may be dynamically allocated to buffered channels to accommodate differing lengths of play action preceding a Key Event and optionally differing lengths of post event commentary that are currently cached.

In an alternate illustrative embodiment of the present invention, the buffering of the delayed content is performed by the uplink instead of the receiver. This approach relieves the playback device 14 of the burden of additional buffering and cost of dedicating storage for that buffering. Furthermore, the uplink may offer two versions of the channels enabled for Key Event alerting to the playback device 14, one without additional delays for listening when Key Event alerting is of no interest to the user, and one that has additional delays applied for listening when Key Event alerting is desired by the user for that channel. The multiple versions of the channel can be identified as separate broadcast channels as in the case for SDARS delivery, or can be via a stream request parameter as in the case for IP streaming delivery.

Applicability to Additional Content Types

As stated above, the present invention is not limited to sports-related content. Illustrative embodiments of the present invention can be equally applied to other content types such as channels broadcasting non-sports content. For example, illustrative embodiments of the present invention can apply to music (e.g., alerting when a new band takes the stage for a live concert as a "Key Event"), news (e.g., alerting when a breaking news story begins as a "Key Event"), or talk radio event (e.g., alerting when a new guest arrives on set as a "Key Event").

Applicability to Pre-Recorded Content

Illustrative embodiments of the present invention are not limited to live events. That is, illustrative embodiments of the present invention can be equally applied to pre-recorded content including, but not limited to, sports re-broadcasts, music concerts, news programs, talk programs, etc. In these cases, the Event Metadata 116 can be conveniently archived with the pre-recorded audio content so that it is automatically transmitted at the proper time when the pre-recorded content is broadcast.

The Event Metadata 116 can also be also archived in pre-recorded content that is stored in local memory in the playback device 14 for later playback at the user's convenience. As an illustrative embodiment, a previously broadcast sports program can be retrieved from an on-demand library over an IP connection to the user's playback device 14. He may then play this program back "offline" at his convenience. The presence of the Event Metadata 116 embedded in or associated with this stored content allows him to "skip" through the stored content to easily locate and listen to the highlights of the game, for example.

In accordance with another illustrative embodiment, for non-live events, or even live events, where a program schedule is known, such scheduling data can be used to automatically generate alerts. For example, for many talk shows, the schedule of which guest appears and when during the run-time of the show is known and can be used to automatically generate Key Event alerts. A user can designate, for example, a list of favorite stars or comedians and, whenever one of them has a guest spot on a talk show (e.g., "comedy central" roast, late night variety program, and so on) indicated by scheduling data monitored at the receiver, an alert can be sent. Thus, such metadata can be generated automatically (i.e., without an operator 104) as the scheduling information is known from the show's producers and provided to the user devices 14.

Applicability to Additional Media Types

Illustrative embodiments of the present invention are not limited to audio content events. That is, illustrative embodiments of the present invention can be equally applied to content involving video, image streams, or combinations of audio and video. For example, illustrative embodiments of the present invention can be applied to sports events shown on a TV, mobile phone or smart phone or computing device with wireless or wireline connectivity, or IP-based video receiver, with "Game Channel" in the above descriptions corresponding to a video sports broadcast channel, and a Content Buffer that buffers and delays video as well as audio signals.

As described above, illustrative embodiments of the present invention can employ a radio receiver or other playback device 14 configured to receive at least one broadcast stream or streamed content that comprises a plurality of different content channels. The playback device 14 selects multiple channels from among the plurality of broadcast channels and buffers content from the selected channels as they are being received simultaneously via the received broadcast stream. The buffered content is used to allow a user to switch between channels during LIVE mode (e.g., listening to content in a broadcast or streamed content stream as it is being received) and is to be distinguished from receivers that buffer content in non-volatile memory for a subsequent or deferred playback mode (e.g., listening to previously received and stored content at another time when a signal is not available, or simply when deferred playback is desired by the user after the content is no longer being received). Alternatively, as stated above, the receiver/playback device 14 can receive one channel at a time and can tune to other program channels.

Illustrative Content Delivery System 10 Employing SDARS and Radio Receivers 14

FIG. 1 depicts an illustrative content delivery system 10 for transmitting at least one exemplary source stream to playback devices 14 (e.g., radio receivers) via satellite(s) 12,16. In accordance with an illustrative embodiment, the source stream provides SDARS. The content delivery system 10 can comprises at least one geostationary satellite 12 for line of sight (LOS) satellite signal reception at the receiver 14, for example. Another geostationary satellite 16 at a different orbital position can be provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and that satellites in other types of orbits can be used.

A playback device 14 can be configured for stationary use (e.g., on a subscriber's premises), or mobile use (e.g., portable use or mobile use in a vehicle), or both. A control center is provided for telemetry, tracking and control of the satellites 12 and 16. The broadcaster or content provider 20 can be a programming center that generates and transmits a composite data stream comprising a plurality of payload channels and auxiliary information, which are multiplexed and transmitted in the composite data stream as a source stream for the receivers 14. For example, the programming center 20 can be configured to obtain content from different information sources and providers and to provide the content to corresponding encoders. The content can comprise both analog and digital information such as audio, video, data, program label information, auxiliary information, and so on.

The programming center 20 can provide SDARS having on the order of 100 different audio program channels to transmit different types of music programs (e.g., jazz, classical, rock, religious, country, and so on) and news programs (e.g., regional, national, political, financial, sports). The SDARS can also provide emergency information, travel advisory information, educational programs, and the like. The auxiliary information can be provided in-band or out-of-band with respect to the different service transmission channels (e.g., Ch. 1 through Ch. 247). For example, a Broadcast Information Channel (BIC) providing the auxiliary information can be transmitted as a separate channel multiplexed with the payload channels. The payload channels can comprise audio content files such as songs and disc jockey (DJ) talk audio content files. The BIC can comprise, for example, messages that correspond to different payload channels. For example, a message can comprise Program Associated Data (PAD), as well as different formats and functions. Further, the timing of messages in relation to a particular channel can vary according to the needs of the service provider and to bandwidth requirements. In other words, a message need not be provided for all of the respective channels in every transmitted frame of the content stream. An illustrative SDARS architecture and processing of a received SDARS broadcast stream is described in further detail in commonly owned U.S. Pat. Nos. 6,154,452 and 6,229,824, the entire contents of which are hereby incorporated herein by reference.

The illustrative embodiments of the present invention are described herein with respect to a satellite digital audio radio service (SDARS) that is transmitted to the receivers 14 by one or more satellites 12, 16 and/or terrestrial repeaters. As stated above, it is to be understood that the source content stream(s) used to achieve a Key Event alert function in accordance with the present invention can be transmitted using other content delivery systems (e.g., other digital audio broadcast (DAB) systems, high definition (HD), AM or FM radio systems), a two-way Internet Protocol (IP) system, a multicast IP or cellular system, a Direct-to-home satellite video system or cable television system, as well as other wireless or wired methods for signal transmission. The content 122, Alert Supported Channels 120 and Event Metadata 116 can be transmitted over one or more satellite transmission paths or via a terrestrial wireless network (e.g., microwave, cellular, and so on), or streamed over an internet, cellular or dedicated IP connection (e.g., 2-way IP), or otherwise transmitted wirelessly or via wireline communications (e.g., wired networks).

Further, it is to be understood that the source content stream(s) used to achieve a Key Event alert function in accordance with the present invention can be received by user devices 14 other than radio receivers that are capable of receiving broadcast or streamed content having one or more channels, including but not limited to mobile telephones, smart phones, radio receivers, tablets, personal computers, personal navigation devices, personal data assistants, portable computing devices, different types of receivers, and so on. An illustrative radio receiver 14 for SDARS will be now described with reference to FIG. 17; however, receivers or playback devices 14 can be configured for other content delivery systems and transmission modes.

Figure 17:
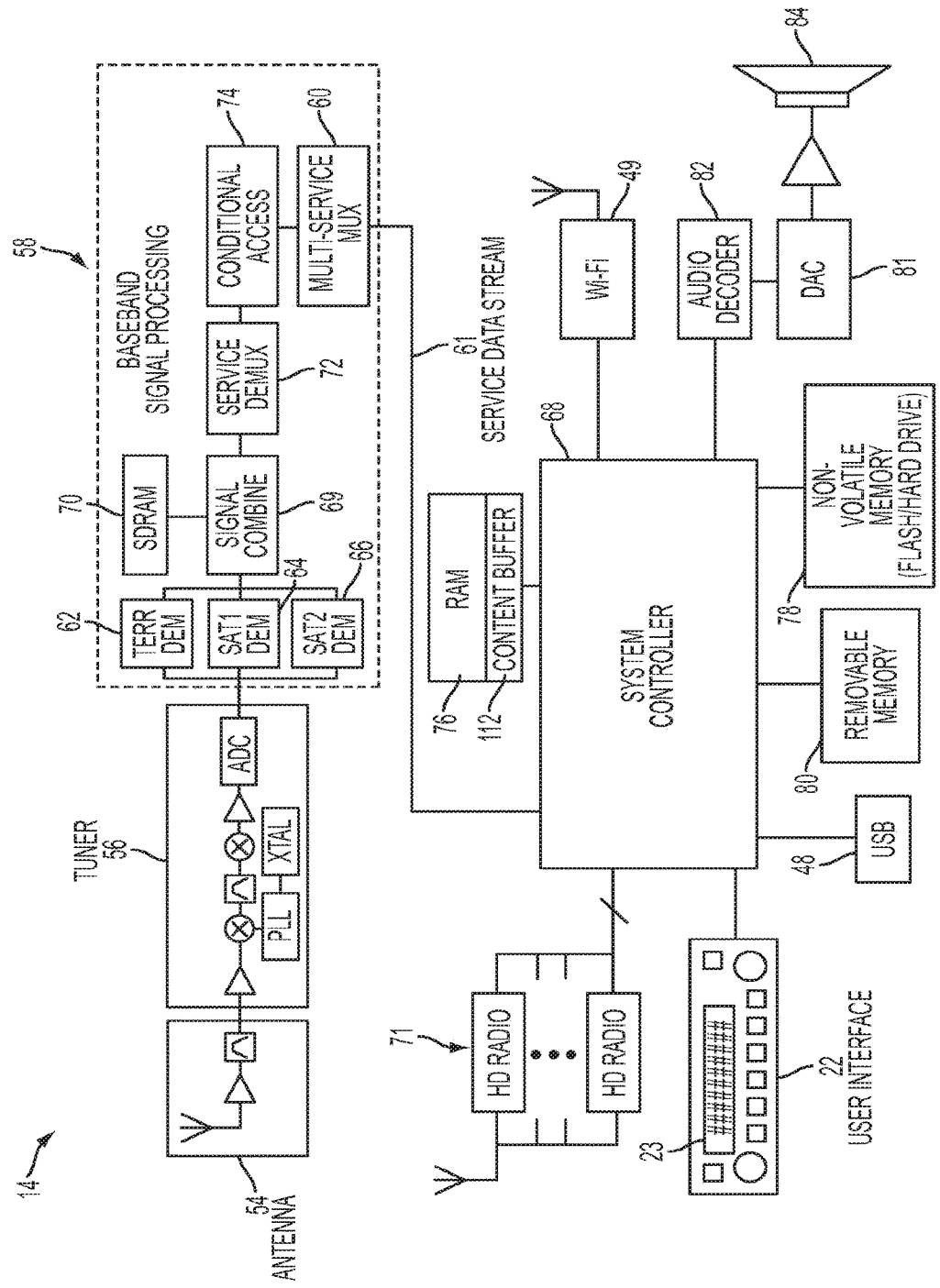
FIG. 17 depicts a user device for receiving broadcast or streamed channels and Event Metadata in accordance with an illustrative embodiment of the present invention.

As shown in FIG. 17, the radio receiver 14 preferably comprises an antenna 54 for receiving, for example, an SDARS signal and/or other broadcast or otherwise transmitted streams, a tuner 56, baseband signal processing components indicated generally at 58, a system controller 68, a multi-service multiplexer MUX 60 and memory, among other components. For example, the receiver 14 comprises an antenna, tuner and receiver arms for processing the SDARS broadcast stream received from at least one of the satellites 12 and 16, a terrestrial repeater as indicated by the demodulators, and optionally a hierarchical modulated stream. These received streams are demodulated, combined and decoded via the signal combiner 69 in combination with the SDRAM 70, and demultiplexed via the service demultiplexer 72 to recover channels from the SDARS broadcast stream.

With continued reference to FIG. 17, a conditional access module 74 can optionally be provided to restrict access to certain demultiplexed channels. For example, each receiver 14 in an SDARS system 10 can be provided with a unique identifier allowing for the capability of individually addressing each receiver 14 over-the-air to facilitate conditional access such as enabling or disabling services, or providing custom applications such as individual data services or group data services. The demultiplexed service data stream 61 can be provided to the system controller 68 from a multi-service multiplexer 60. Also, the system controller 68 may be enabled to provide a second level multiplexer to multiplex content from the satellite multi-service multiplexer 60, an HD receiver bank 71, a WiFi link 49, among other sources.

The system controller 68 in the radio receiver 14 is connected to memory (e.g., a RAM 76, a non-volatile memory 78, and an optional removable memory 80 and/or USB 45), a user interface 22, and at least an audio decoder 82. A video decoder can also be provided. Processing of a received SDARS broadcast stream is described in further detail in the afore-mentioned U.S. Pat. Nos. 6,154,452 and 6,229,824.

In accordance with an illustrative embodiment of the present invention, the radio receiver 14 is provided with a memory (e.g., RAM 76) or a part of a memory that is a multi-channel memory for buffering at least selected ones of received channels. In the illustrated example of FIG. 17, the multi-channel memory is referred to as a content buffer 112 and can be managed by firmware, for example, to support storing content from multiple channels that have been broadcast, streamed or otherwise transmitted to the receiver 14. As described above, the content buffer 112 can store content from all received channels provided by one or more content transmission services, depending on the processing and storage capabilities of the receiver 14, or buffer content from only selected received channels such as the Alert Supported Channels determined for a user, and/or Smart Favorite™ channels of a currently active Tune Start™ channel configuration as described in International PCT application no. PCT/US2012/25091, filed Feb. 14, 2012, and/or constituent channels in one or more Mix Channel configurations as described in U.S. patent application Ser. No. 13/531,440, filed Jun. 22, 2012, the entire contents of both applications being incorporated herein by reference. Reference is also made to the above-mentioned U.S. Pat. Nos. 7,454,166 and 8,223,975 for storage of received broadcast or streamed content at a user device 14.

With continued reference to FIG. 17, the radio receiver 14 can have a USB port 48 to allow settings and other operating data to be transferred between another device and the receiver 14. A removable memory 80 and interface can also be provided such as a micro SD card to allow also transfer of personalized radio multi-channel customization parameters, for example, or a cartridge on which other buffered content is stored (e.g., acquired content, or content made available in MYRADIO mode) for playback when reception of the live source stream is not available as described in U.S. patent application Ser. No. 11/239,642, filed Sep. 30, 2005. Finally, non-volatile memory 78 and/or the RAM 76 can be used by the system controller 68 for storing program code, for example.

The content buffer 112 or multi-channel memory can be implemented in any R/W memory technology such as a static RAM, SDRAM, DDRAM, embedded RAM or non-volatile memory block. For example, the RAM device 76 can be partitioned into dedicated channel blocks such that, as frames of source data stream are received, each of the channels designated for buffering are extracted and mapped to a separate RAM memory block and recorded in circular buffer format. Pausing playback of a buffered channel is allowed, as well as reverse or backtracking operations among tracks within the buffered channel as identified by track of segment boundaries as described in the above-referenced U.S. patent application Ser. No. 13/531,440, filed Jun. 22, 2012. Selected content for buffering and playback can be based via user inputs to a user interface 22 as shown. As described above in connection with FIGS. 5-16, the user interface 22 comprises a display 23 and input devices (e.g., buttons, dials) for selecting received program channels for playback and navigating buffered content (e.g., in a Mix Channel).

Illustrative embodiments of the present invention have been described with reference to a content delivery system 10 and receivers/playback devices 14 having firmware and/or program code. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

The above-presented description and figures are intended by way of example only and are not intended to limit the present invention in any way except as set forth in the following claims. It is particularly noted that persons skilled in the art can readily combine the various technical aspects of the various elements of the various exemplary embodiments that have been described above in numerous other ways, all of which are considered to be within the scope of the invention.

What is claimed is:

1. A method of alerting a user of a tuned channel to events of interest occurring on other available channels, comprising:

receiving, by a receiver and from a content stream, a plurality of program channels and metadata associated with the plurality of program channels;

identifying, by the receiver, a subset of the plurality of program channels as designated channels;

buffering, by the receiver, the designated channels in a buffer as received;

identifying, by the receiver and based at least in part on the received metadata, a desired content occurring on a desired channel of the designated channels at a later time from a current playback time;

overlaying, by the receiver and in response to the identifying the desired content, a selectable alert message relating to the desired content, on current content corresponding to a currently presented channel from the plurality of program channels;

after receiving a user input indicative of a selection of the alert message, switching, by the receiver, from a currently presented channel to the desired channel, wherein the desired channel is delayed in time, with respect to the currently tuned channel, by an amount based at least in part on a delay associated with buffering the desired content through the buffer, a time from tagging of the desired content to generating and transmitting the metadata, identifying a longest duration of play action preceding the desired content that is to be played back, and a lead time preceding a start of the desired content that is based on the metadata; and playing the desired channel based on the amount the desired channel is delayed in time.

2. The method according to claim 1, wherein the metadata comprises data that enable the receiver to play the desired content from a designated start time.

3. The method according to claim 1, wherein the amount of time is configured to allow a user to tune to the desired channel prior to playback of the desired content.

4. The method of claim 1, further comprising automatically switching to, by the receiver, and playing the desired content in response to the alert message.

5. The method of claim 1, further comprising, after the overlaying the alert message:

continuing to play the currently tuned channel in an absence of the user input to switch to the desired channel.

6. The method of claim 1, further comprising demultiplexing the desired channel for playback in response to the alert message.

7. The method of claim 1, wherein the playback of the desired content is delayed by choosing a buffered playback point in the desired channel that is delayed from real-time reception of the desired channel by at least the amount of time.

8. The method of claim 7, wherein the amount of time is further based at least in part on at least one of type of key event, type of program, or time value included in the metadata.

9. The method according to claim 1, wherein the amount of time is further based at least in part on a time required to generate the alert message and a predefined time for a user to tune the receiver to the desired channel in response to the generated alert message, the method further comprising:

managing a size of the buffer based at least in part on the time from tagging of the key event to inclusion of that tag in the transmission of the metadata, the longest duration of play action, the time required to generate the alert message, and the predefined time, so as to delay playback of the desired content in the desired channel.

10. A broadcast receiver comprising:
a display;
at least one processor;
memory coupled to the at least one processor; and
a computer program stored in the memory, the computer program including instructions for:

receiving, from a content stream, a plurality of program channels and metadata associated with the plurality of program channels;

identifying, by the receiver, a subset of the plurality of program channels as designated channels;

buffering the designated channels in a buffer as received;

identifying, based at least in part on the received metadata, a desired content occurring on a desired channel of the designated channels at a later time from a current playback time;

overlaying, by the receiver and in response to the identifying the desired content, a selectable alert message relating to the desired content, on current content corresponding to a currently presented channel from the plurality of program channels;

after receiving a user input indicative of a selection of the alert message, switching, by the receiver, from a currently presented channel to the desired channel, wherein the desired channel is delayed in time, with respect to the currently tuned channel, by an amount based at least in part on a delay associated with buffering the desired content through the buffer, a time from tagging of the desired content to generating and transmitting the metadata, identifying a longest duration of play action preceding the desired content that is to be played back, and a lead time preceding a start of the desired content that is based on the metadata; and playing the desired channel based on the delay in time.

11. The broadcast receiver according to claim 10, wherein the metadata comprises data that enable the receiver to play the desired content from a designated start time.

12. The broadcast receiver according to claim 10, wherein the amount of time is configured to allow a user to tune to the desired channel prior to playback of the desired content.

13. The broadcast receiver according to claim 10, wherein the instructions further comprise automatically switching to, by the receiver, and playing the desired content in response to the alert message.

14. The broadcast receiver according to claim 10, wherein the instructions further comprise, after the overlaying the alert message:

continuing to play the currently tuned channel in an absence of the user input to switch to the desired channel.

15. The broadcast receiver according to claim 10, further comprising a demultiplexer configured to demultiplex the desired channel for playback in response to the alert message.

16. The broadcast receiver according to claim 10, wherein the playback of the desired content is delayed by choosing a buffered playback point in the desired channel that is delayed from real-time reception of the desired channel by at least the amount of time.

17. The broadcast receiver according to claim 16, wherein the amount of time is further based at least in part on at least one of type of key event, type of program, or time value included in the metadata.

18. The method of claim 10, wherein the amount of time is further based at least in part on a time required to generate the alert message and a predefined time for a user to tune the receiver to the desired channel in response to the generated alert message, the method further comprising:

managing a size of the buffer based at least in part on the time from tagging of the key event to inclusion of that tag in the transmission of the metadata, the longest duration of play action, the time required to generate the alert message, and the predefined time, so as to delay playback of the desired content in the desired channel.

\* \* \* \* \*